United States Patent [19]

Nishida et al.

[11] Patent Number: 5,745,513
[45] Date of Patent: Apr. 28, 1998

[54] LASER OSCILLATOR WITH STABILIZED POINTING

[75] Inventors: Satoshi Nishida; Akihiro Otani, both of Nagoya, Japan

[73] Assignee: Mitsubishi Denki Kabushiki Kaisha, Tokyo, Japan

[21] Appl. No.: 825,087

[22] Filed: Mar. 27, 1997

Related U.S. Application Data

[62] Division of Ser. No. 654,894, May 29, 1996, Pat. No. 5,675,598.

[30] Foreign Application Priority Data

May 16, 1994 [JP] Japan ................... 6-101372

[51] Int. Cl.[6] ................................................. H01S 3/04
[52] U.S. Cl. ........................ 372/34; 372/35; 372/58
[58] Field of Search ................... 372/34, 35, 55, 372/58

[56] References Cited

U.S. PATENT DOCUMENTS 3,538,454  11/1970  Siegenthaler ................ 372/35
4,780,882  10/1988  Nir ............................. 372/34

FOREIGN PATENT DOCUMENTS

| 4233094 | 10/1992 | Germany . |
| 60-81883 | 5/1985 | Japan . |
| 60-254683 | 12/1985 | Japan . |
| 62-133785 | 6/1987 | Japan . |
| 62-133786 | 6/1987 | Japan . |
| 62-133787 | 6/1987 | Japan . |
| 5-95142 | 4/1993 | Japan . |

*Primary Examiner*—Rodney B. Bovernick
*Assistant Examiner*—Robert E. Wise
*Attorney, Agent, or Firm*—Sughrue, Mion, Zinn, Macpeak & Seas, PLLC

[57] ABSTRACT

A laser oscillator has a casing 10. A cooling medium is supplied from an inlet port 134 to a heat exchanger 8 via a pipe 35, and discharged form it via a pipe 37 and an outlet port 136. The ports 134 and 136 are symmetrically positioned relative to a center line of the casing when seen from upward. An inlet port 340 and an outlet port 342 have a similar positional relation ship thereto.

3 Claims, 25 Drawing Sheets

LASER OSCILLATOR WITH STABILIZED POINTING

This is a division of Application Ser. No. 08/654,894 filed May 29, 1996, now U.S. Pat. No. 5,675,598.

BACKGROUND OF THE INVENTION

1. Field of the Invention

The present invention relates to a laser oscillator that aims to stabilize pointing, namely a radiating position and a radiating direction of a laser beam.

2. Description of Related Art

Japanese Patent Publication (Kokoku) Nos. 63-64073 and 634-832 respectively disclose laser oscillators.

FIG. 20 is a perspective view diagramatically showing a laser oscillator disclosed in the Japanese Patent Publication (Kokoku) No. 63-64073.

Referring to FIG. 20, the oscillator radiates a laser beam 2. It has a duct 3 functioning as a laser medium gas passage, a pair of discharging electrodes 4a and 4b, a first laser beam reflecting unit 5a, a second laser beam reflecting unit 5b, a blower 6, a heat exchanger 8, and a casing 10 sealingly containing a laser medium gas under a low vacuum of about 1/10 normal atmosphere. A total reflector 26 is accommodated in the 2nd reflecting unit 5b. A partial reflector 32 is accommodated in the 1st reflecting unit 5a.

FIG. 21 is a front view showing a laser oscillator disclosed in the Japanese Publication (Kokoku) No. 64-832. FIG. 22 is a plan view of the oscillator of FIG. 21. FIG. 23 is a right side view of the oscillator of FIG. 21. FIG. 24 is an enlarged section taken along the line 24—24 and showing details of the oscillator of FIG. 23. FIG. 25 is an enlarged section taken along the line 25—25 and showing details of the oscillator of FIG. 23. FIG. 26 is an enlarged section taken along the line 26—26 and showing details of the oscillator of FIG. 23.

Referring to FIGS. 21 to 26, the oscillator has metal bellows 7, nuts 9, roller bearings 11, brackets 12, housings 13, spherical bearings 14, flanges 15, bolts 16 and 18, collars 17, base plates 20a and 20b, fixing seats 22 disposed on the casing 10, and supporting rods 24a, 24b and 24c. An inlet port 34 and an outlet port 36 are provided on the casing 10 for passing a cooling medium for cooling the heat exchanger 8. Pipes 35 and 37 connect the inlet port 34 and the outlet port 36 to the heat exchanger 8. An inlet port 40 and an outlet port 42 are provided on the casing 10 for passing a cooling medium for cooling a pair of discharging electrodes 4a and 4b. Pipes 41 and 43 connect the inlet port 40 and the outlet port 42 to the discharging electrodes 4a and 4b. A pipe 45 connects the discharging electrodes 4a and 4b. Fixing seats 22 fix the casing 10 to another structure.

An operation of the oscillator is described as follows.

In the casing 10, a pair of electrodes 4a and 4b produce discharge and excite the laser medium gas, and the blower 6 circulates the laser medium gas. The laser medium gas is cooled by the heat exchanger 8. The laser medium gas passes between the discharging electrodes 4a and 4b and is excited into a laser oscillatable state. The laser medium gas, that is raised to a high temperature by the discharge, flows into the duct 3, is cooled in the heat exchanger 8, and is circulated in an arrow direction A through the blower 6. A resonator mirror is constituted by the partial reflector 32 contained in the laser beam reflecting unit 5a and the total reflector 26 contained in the laser beams reflecting unit 5b, which are arranged in the longitudinal direction of the casing 10. An optical path produced by the resonator mirror passes through an excited area in which the laser medium gas is excited by discharging.

The laser beam reflected by the total reflector 26 reaches the partial reflector 32. Part of the laser beam which has reached the partial reflector 32 is permitted to be outputted to an exterior, and the rest returns to the total reflector 26 through an inverted route, thereby repeating the same process. The laser beam is amplified as it repeatedly passes the excited area as mentioned above, and is outputted from the partial reflector 32 to the exterior. The laser beam reflecting units 5a and 5b are mounted on a pair of base plates 20a and 20b which are held by the three supporting rods 24a, 24b and 24c. The bellows 7 connect the casing 10 and the base plates 20a and 20b positioned at right and left sides thereof to each other so as not to transmit external force to them.

In operating the laser oscillator, a cooling medium such as water needs to be supplied from a cooling unit or the like (not shown). The cooling medium introduced in the casing 10 via the inlet port 34 is supplied to the heat exchanger 8 through the pipe 35, and discharged out of the casing 10 through the outlet port 36. The cooling medium introduced in the casing 10 via the inlet port 40 enters into the lower discharging electrode 4b through the pipe 41, enters the upper discharging electrode 4a through the pipe 45, and is discharged out of the casing 10 through the pipe 43 and the outlet port 42. The casing 10 is fixed to a comparatively rigid structure such as a floor with foundation work or a frame of a power supply panel for supplying power to the laser oscillator, by use of the four fixing seats 22 provided at the lower part thereof.

Next, a supporting structure of the casing 10 and the base plates 20a and 20b is described. The base plate 20a is supported by the three supporting rods 24a, 24b and 24c. The connecting structures of the supporting rods 24a, 24b and 24c to the casing 10 are different. Namely, as shown in FIG. 25, the supporting rod 24a is held by the spherical bearing 14a in the housing 13 which is mounted on the casing 10. The base plate 20a is secured to one axial end of the supporting rod 24a by the nut 9. As shown in FIG. 26, the roller bearing 11 is attached to the supporting rod 24b, and the bracket 12 is fixed to the casing 10 by the bolt 18 and contacts linearly with the lower surface and the plane surface of the roller bearing 11. The collar 17 serves to position the roller bearing 11 when fastening the supporting rod 24b to the base plate 20a by the nut 9. As shown in FIG. 24, the supporting rod 24c is fixed to the base plate 20a by the nut 9 so as to be isolated from the casing 10. The three supporting rods 24a, 24b and 24c are made of a material of smaller linear expansion coefficient, such as invar, so that the base plates 20a and 20b do not lose their parallelism, even if there is a temperature change.

In operating the laser oscillator, first, the blower 6 is started. At the same time, a cooling medium generally of a temperature lower than a room temperature (e.g. 10° C. ) is supplied to the heat exchanger 8 and the discharging electrodes 4a and 4b, thereby causing the temperature and flow velocity of the cooling medium to assume a predetermined state at an entrance portion between the discharging electrodes 4a and 4b, so that the laser medium gas is effectively excited by discharge. After the cooling medium is supplied, the laser medium gas circulates at high speed when the blower 6 reaches a predetermined rotating speed, so that the laser medium gas has a predetermined temperature and a predetermined flow velocity. The time necessary for the preparatory operation corresponds to a rise time during which the rotating speed of the blower 6 reaches predetermined value. When the laser oscillator is ready, the laser is in a state capable of being oscillated.

The casing 10 changes its temperature gradually from the room temperature to a temperature near the cooling medium temperature, since the cooling medium pass the inlet ports 34 and 40 and the outlet ports 36 and 42. A time constant of the temperature variation is determined by a heat capacity of the casing 10. The constant is longer than the rise time of the laser oscillator, and changes gradually even after the laser oscillator has been ready. In case the cooling medium temperature is lower than the room temperature, a portion of the casing 10 specified by narrow slanted broken lines in FIG. 27 is partially cooled due to heat conduction from the inlet port 34, 40 or the outlet port 36, 42. Then, as shown in FIG. 27, only the upper part (part at the duct 3 side) is contracted due to linear expansion, thereby causing strain in the casing 10. As a result, the positions of the base plates 20a and 20b supported by the casing 10 are changed, so that a pointing of the laser beam is varied when oscillating laser. This phenomenon takes place at the time of rising and falling of the laser oscillator and has a comparatively long time constant. The strain amount of the casing 10 is determined by the difference between the cooling medium temperature and the ambient temperature. This phenomenon is called a "first mode of casing strain".

The laser medium gas made into a high temperature after passing the discharging electrodes 4a and 4b flows in the duct 3 when operating the laser oscillator, so that the duct 3 has a high temperature. Thus, the casing 10 adjacent to the duct 3 receives an entering heat due to heat radiation from the hot duct 3, so that part of the casing 10 facing the duct 3 experiences a gradual rise in its temperature and expands by heat expansion. Therefore, as shown in FIG. 28, there arises strain on the casing 10. As a result, the pointing of the laser beam is varied when oscillating the laser. This phenomenon is produced by ON and OFF operations of the laser oscillator and has a comparatively long time constant. The strain amount of the casing 10 is determined by a magnitude of a discharging input. This phenomenon is called a "second mode of casing strain".

In the oscillator of the background art, the three supporting rods 24a, 24b and 24c are supported on the base plates 20a and 20b in the same way, and there are no elements to mechanically determine the relative positional relationship between the casing 10 and the two base plates 20a and 20b secured to the three supporting rods 24a, 24b and 24c. This is because the supporting rod 24a is slidable on the inner surface of the spherical bearing 14a, as shown in FIG. 25, and the supporting rod 24b is slidable between the roller bearing 11 mechanically positioned by the collar 17 and the bracket 12. Accordingly, if a large acceleration is applied to such a sliding portion at the time of transportation or the like, the sliding portion possibly slides, and a stepped portion of the supporting rod 24a and the housing 13, or the stepped portion of the supporting rod 24b and the bracket 12, come into contact with each other. Thereby, though the casing 10 and the base plate 20a are isolated from each other before the above members are contacted, they will directly receive the strain force from the casing due to the above contact. Therefore, the base plates 20a and 20b will be directly affected by a large change of the casing 10, thereby preventing repeatability of the laser beam pointing.

Moreover, if the first mode of casing strain or the second mode of casing strain takes place, the distance between the two spherical bearings 14, which are fixed on the casing 10 that holds the supporting rod 24a, is relatively changed due to linear expansion (or contraction) by the temperature change of the casing 10. Therefore, the supporting rod 24a needs to slide on any one of the contact surfaces of the two spherical bearings 14a and 14b. Here, it is not certain whether the base plate 20a slides or the base plate 20b slides, since the plate having the least friction coefficient at that time will slide. Moreover, it is not assured that the slided side of the casing 10 due to the casing strain slides in the same amount when the casing 10 has gone back to a state before the strain. Thus, there is little repeatability of the relative position between the casing 10 and the base plates 20a and 20b, when repeating the rising and falling operations of the laser oscillator and ON and OFF operations of the laser. Accordingly, it is possible that the stepped portion of the supporting rod 24a and the housing 13 or the stepped portion of the supporting rod 24b and the bracket 12 sometime contact with each other, thereby causing factor of lack of repeatability of the laser beam pointing due to the contact.

It has been assumed that, if the parallelism of the resonant mirrors is maintained, the characteristics of the laser beam in laser operation does not change. However, it has been known that, if the relative positional relationship of the facing resonant mirrors, namely the relative positional relationship of the two base plates 20a and 20b and the casing 10 becomes offset, such characteristics as a beam mode and a converging performance of the laser beam, slightly change. Usually, there is brought forth a change in the relative lengths of the casing 10, which is made of a metal like iron, and the supporting rods 24a, 24b and 24c, which are made of a material of low linear expansion, each time that they are vibrated in transportation or the like or when the first or second mode of casing strain is generated and repeated. Moreover, the relative position between the base plates 20a and 20b and the casing 10 does not always go back to an original position when they return to their original lengths, respectively. It is possible that an offset of the relative position becomes larger gradually with time. Accordingly, the characteristics of the laser beam sometimes change with time. Thus, in case the laser oscillator is used for a laser work of high accuracy or the like, there arises a problem that the working effects will change in time.

The laser oscillator of background art is constructed as above, and requires improvement because the pointing stability of the laser beam will be lowered due to heat strain of the casing 10.

SUMMARY OF THE INVENTION

In view of the above, it is an object of the invention to provide a laser oscillator that lessens the influences of heat strain on a casing and provides a stabilized pointing of a laser beam.

In accordance with one preferred embodiment of the invention, there is provided a laser oscillator that comprises: a casing sealingly containing a laser medium gas; a pair of discharging electrodes oppositely disposed in the casing so as to oscillate a laser beam by use of the laser medium gas; a circulating means for circulating the laser medium gas in the casing; a heat exchanger disposed in the casing to cool the laser medium gas that is heated by discharge generated by the discharging electrodes; an inlet port disposed at a first position of the casing to supply a cooling medium to the heat exchanger; and an outlet port disposed in the casing, at a second position substantially symmetrical to the first position of the inlet port in relation to a center line of the casing that is parallel to the discharging electrodes, to discharge the cooling medium out of the heat exchanger.

There is also provided a laser oscillator that comprises: a casing sealingly containing a laser medium gas; a pair of discharging electrodes oppositely disposed in the casing so as to oscillate a laser beam by use of the laser medium gas; a circulating means for circulating the laser medium gas in the casing; and a plurality of heat exchangers disposed in the casing to cool the laser medium gas that is heated by discharge generated by the discharging electrodes, the heat exchangers being disposed at substantially symmetrical positions in relation to a center point of the casing.

There is also provided a laser oscillator that comprises: a casing sealingly containing a laser medium gas; a pair of discharging electrodes opposited disposed in the casing so as to oscillate a laser beam by use of the laser medium gas; a circulating means for circulating the laser medium gas in the casing; an inlet port disposed at a first position of the casing to supply a cooling medium to the discharging electrodes; and an outlet port disposed in the casing, at a second position substantially symmetrical to the first position of the inlet port in relation to a center line of the casing that is parallel to the discharging electrodes, to discharge the cooling medium out of the discharging electrodes.

There is also provided a laser oscillator that comprises: a casing sealingly containing a laser medium gas; a pair of discharging electrodes oppositely disposed in the casing so as to oscillate a laser beam by use of the laser medium gas; a circulating means for circulating the laser medium gas in the casing; a heat exchanger disposed in the casing to cool the laser medium gas that is heated by discharge generated by the discharging electrodes; an inlet port and an outlet port disposed on the casing to supply and discharge a cooling medium to and from the heat exchanger; passage forming members disposed respectively in the inlet port and the outlet port; and insulating members respectively interposed between the inlet port and outlet port and the passage forming members so as to heatingly insulate the ports and the passage forming member.

There is also provided a laser oscillator that comprises: a casing sealingly containing a laser medium gas; a pair of discharging electrodes oppositely disposed in the casing so as to oscillate a laser beam by use of the laser medium gas; a circulating means for circulating the laser medium gas in the casing; an inlet port and an outlet port disposed on the casing to supply and discharge a cooling medium to and from the discharging electrodes; passage forming members disposed respectively in the inlet port and the outlet port; and insulating members respectively interposed between the inlet port and outlet port and the passage forming members so as to heatingly insulate the ports and the passage forming member.

There is also provided a laser oscillator that comprises: a casing sealingly containing a laser medium gas; a plurality of supporting rods disposed in a longitudinal direction of the casing; a plurality of supporting members respectively fitted around longitudinal ends of the supporting rods; a pair of base plates supported on the casing via the supporting members in a facing manner to each other; laser beam reflecting means including a plurality of laser reflector disposed on the base plates; and a plurality of fixing seats disposed on the casing substantially right under the supporting members so as to fix the casing to a structure.

There is also provided a laser oscillator that comprises: a casing sealingly containing a laser medium gas; a plurality of supporting rods disposed in a longitudinal direction of the casing; a plurality of supporting members respectively fitted around longitudinal ends of the supporting rods, each supporting member including a pair of bearings respectively fitted around the longitudinal ends of the supporting member and a means for mechanically determining positional relationship of one the bearings and the supporting rod; a pair of base plates supported on the casing via the supporting members in a facing manner to each other; and laser beam reflecting means including a plurality of laser reflector disposed on the base plates.

There is also provided a laser oscillator that comprises a casing sealingly containing a laser medium gas; a plurality of supporting rods disposed in a longitudinal direction of the casing; a plurality of supporting members respectively fitted around longitudinal ends of the supporting rods, each supporting member including a pair of spherical bearings respectively fitted around the longitudinal ends of the supporting member and a means for mechanically determining positional relationship of one the bearings and the supporting rod, the mechanically determining means having an elastic member pressing the spherical bearing to a shoulder of the supporting rod; a pair of base plates supported on the casing via the supporting members in a facing manner to each other; and laser beam reflecting means including a plurality of laser reflector disposed on the base plates.

There is also provided a laser oscillator that comprises a casing sealingly containing a laser medium gas; a pair of discharging electrodes oppositely disposed in the casing so as to oscillate a laser beam by use of the laser medium gas; a circulating means for circulating the laser medium gas in the casing; a plurality of heat exchangers disposed in the casing to cool the laser medium gas that is heated by discharge generated by the discharging electrodes, the heat exchangers being disposed at substantially symmetrical positions in relation to a center point of the casing; and fixing seats disposed substantially at longitudinal ends of the casing so as to fix the casing to a structure.

There is also provided a laser oscillator that comprises: a casing sealingly containing a laser medium gas; a pair of discharging electrodes oppositely disposed in the casing so as to oscillate a laser beam by use of the laser medium gas; a circulating means for circulating the laser medium gas in the casing; a heat exchanger disposed in the casing to cool the laser medium gas that is heated by discharge generated by the discharging electrodes; an inlet port and an outlet port respectively disposed on the casing to supply and discharge a cooling medium to and from the heat exchanger, the inlet port and the outlet port being disposed in an opposite manner substantially at an equal distance to a center line of the casing that is parallel to the discharging electrodes; and fixing seats disposed substantially at longitudinal ends of the casing so as to fix the casing to a structure.

There is also provided a laser oscillator that comprises: a casing sealingly containing a laser medium gas; a pair of discharging electrodes oppositely disposed in the casing so as to oscillate a laser beam by use of the laser medium gas; a circulating means for circulating the laser medium gas in the casing; an inlet port and an outlet port respectively disposed on the casing to supply and discharge a cooling medium to and from the discharging electrodes, the inlet port and the outlet port being disposed in an opposite manner substantially at an equal distance to a center line of the casing that is parallel to the discharging electrodes; and fixing seats disposed substantially at longitudinal ends of the casing so as to fix the casing to a structure.

Further objects and advantages of the invention will be apparent from the following description, reference being had to the accompanying drawings, wherein preferred embodiments of the invention are clearly shown.

DESCRIPTION OF THE PREFERRED EMBODIMENTS

The inventive laser oscillator will be described hereunder according to several preferred embodiments.

Figure 1:
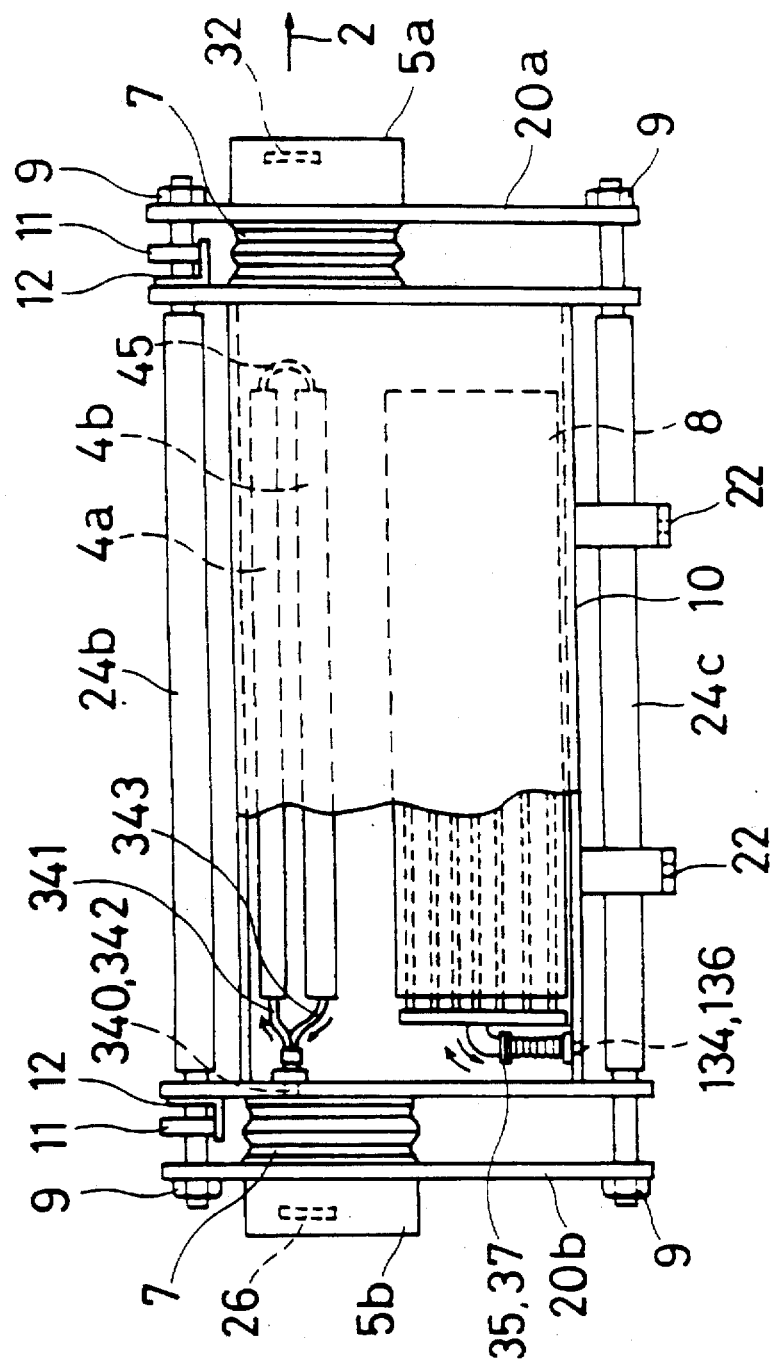
FIG. 1 is a front view showing a first embodiment of a laser oscillator of the invention.
Figure 2:
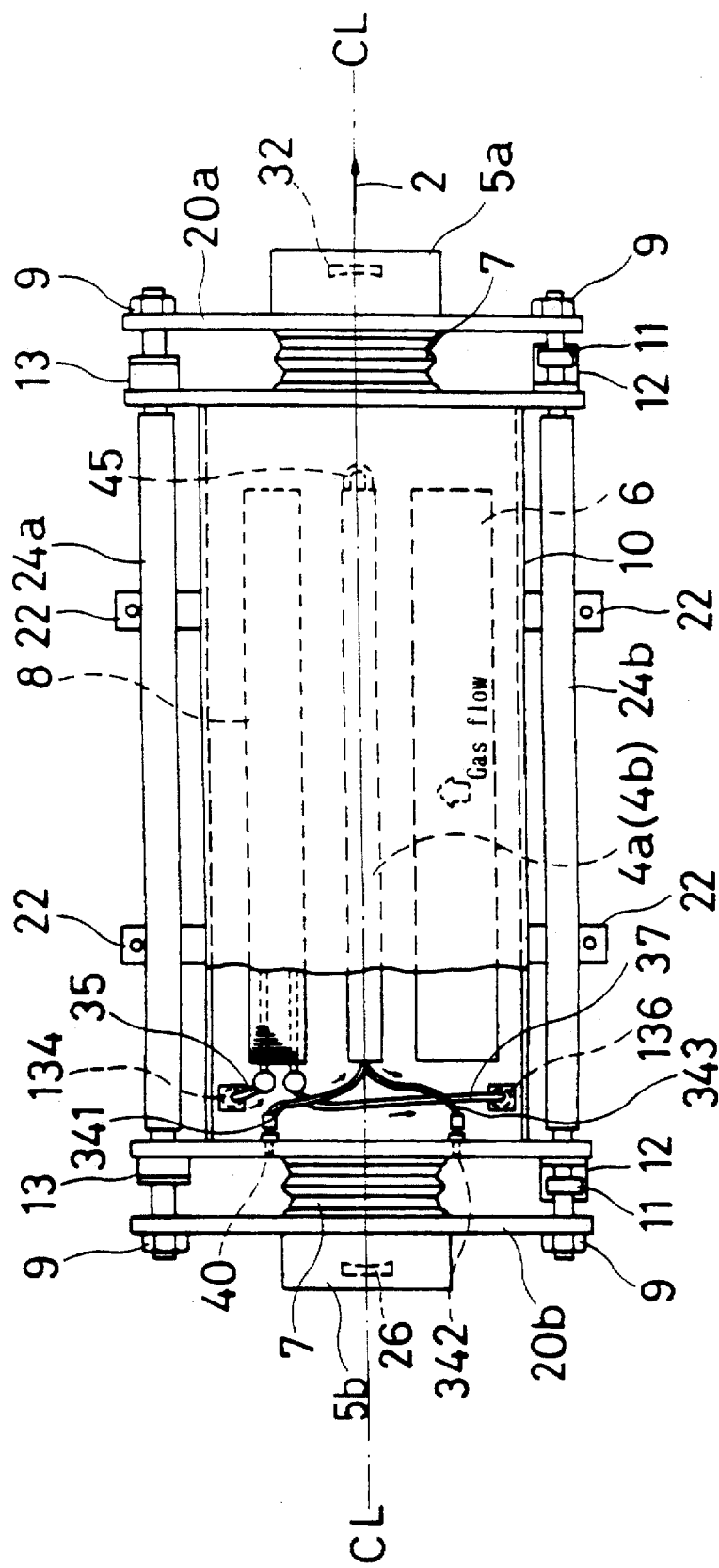
FIG. 2 is a plan view showing a laser oscillator of FIG. 1.
Figure 20:
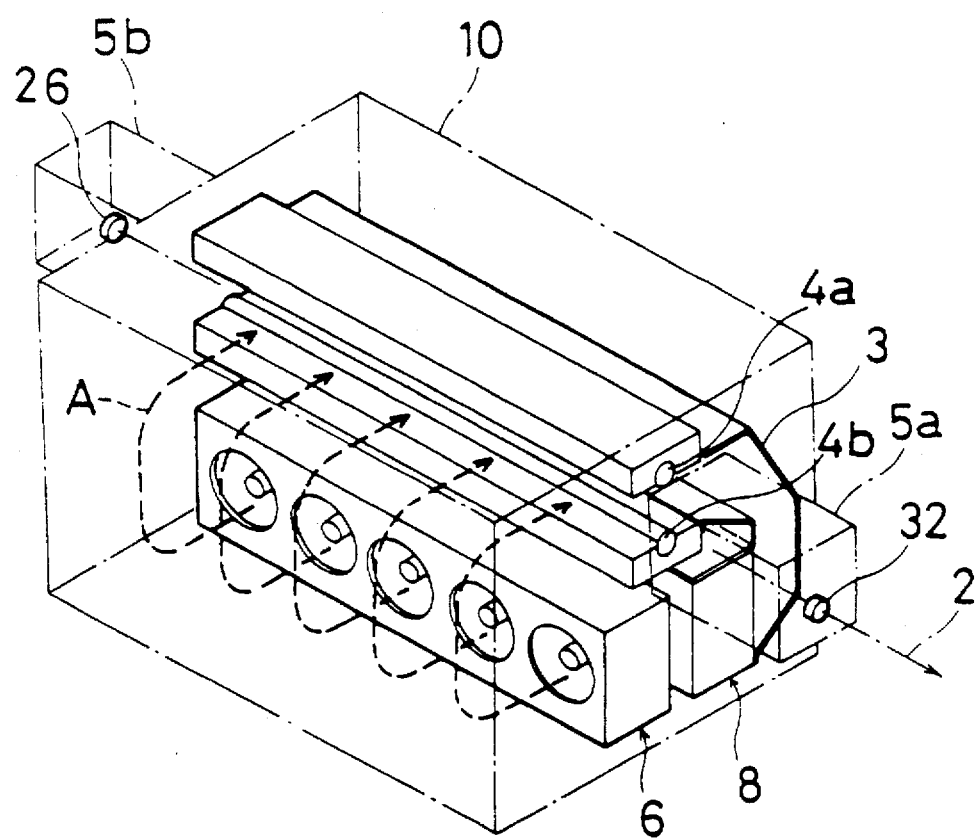
FIG. 20 is a perspective view diagramatically showing a laser oscillator disclosed in the Japanese Patent Publication (Kokoku) No. 63-64073.
Figure 21:
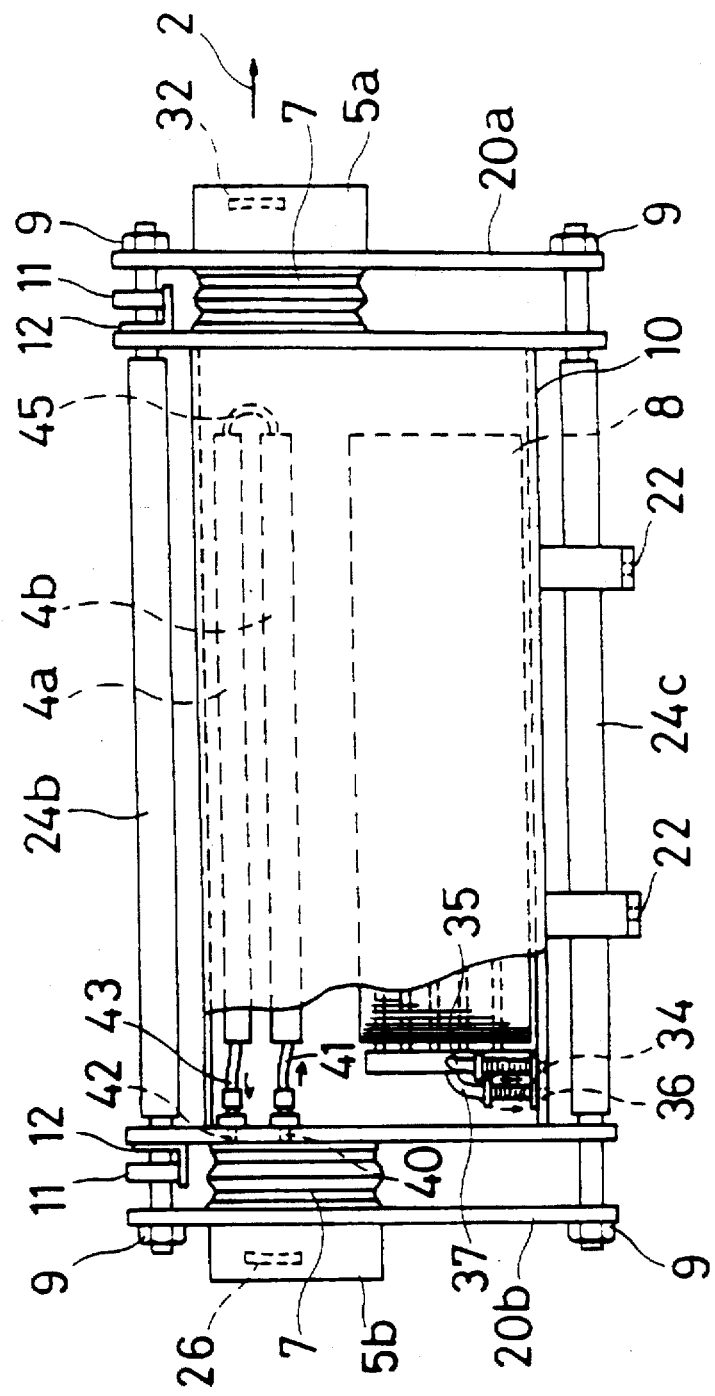
FIG. 21 is a front view showing a laser oscillator disclosed in the Japanese Publication (Kokoku) No. 64-832.

FIG. 1 is a front view showing a first embodiment of a laser oscillator of the invention. FIG. 2 is a plan view showing a laser oscillator of FIG. 1. The inventive laser oscillator has the same structure as that of the laser oscillator of related art shown in FIG. 20 except characteristic features described below, and description of the same members or elements will be omitted hereunder. In FIGS. 1 and 2, the same reference numerals are attached to similar or corresponding members or elements to those of related art shown in FIGS. 20 and 21, thereby eliminating their detailed description. The following description will focus on the differences between the inventive laser oscillator and the laser oscillator of related art.

Referring to FIGS. 1 and 2, the first embodiment of the laser oscillator has a casing 10 sealingly containing a laser medium gas. A pair of discharging electrodes 4a and 4b are oppositely disposed in the casing 10 and oscillate a laser beam by use of the laser medium gas. A blower 6 as a circulating means circulates the laser medium gas in the casing 10. A heat exchanger 8 is also arranged in the casing 10 and cools the laser medium gas made in a high temperature by the discharge of the discharging electrodes 4a and 4b. These structures are similar to those of related art mentioned above. The inventive laser oscillator has improvements in arrangements or positions of an inlet port 134 and an outlet port 136. Namely, the inlet port 134 and the outlet port 136 are positioned symmetrically on a bottom wall of the casing 10 when seen from upward or downward as described in detail below.

As shown in FIG. 1, the inlet port 134 for the heat exchanger 8 is disposed at one corner part of the bottom wall of the casing 10 so as to introduce a cooling medium into the casing 10. In the illustrated embodiment, as shown in FIG. 1, the position of the inlet port 134 is set at a corner of the bottom wall that is near a back wall and a left wall of the casing 10. The inlet port 134 is connected to the pipe 35 and the cooling medium is fed to the heat exchanger 8 via the pipe 35. On the other hand, as seen in FIG. 2, the outlet port 136 for the heat exchanger 8 is disposed at another corner part of the bottom wall of the casing 10 so as to discharge the cooling water out of the casing 10. In the illustrated embodiment, as shown in FIG. 2, the position of the outlet port 136 is set at a corner of the bottom wall that is near a front wall and the left wall of the casing 10. Moreover, the inlet port 134 and the outlet port 136 have a special positional relationship to each other. Namely, as seen in FIG. 2, they are disposed at substantially symmetrical positions in relation to a center line CL—CL of the casing 10 that extends in a longitudinal direction thereof in parallel with a longitudinal direction of the discharging electrode 4a, 4b. The outlet port 136 is connected to the pipe 37 and the cooling medium is conducted out of the casing 10 via the pipe 37.

An operation of the above structured laser oscillator is described hereunder.

Figure 3:
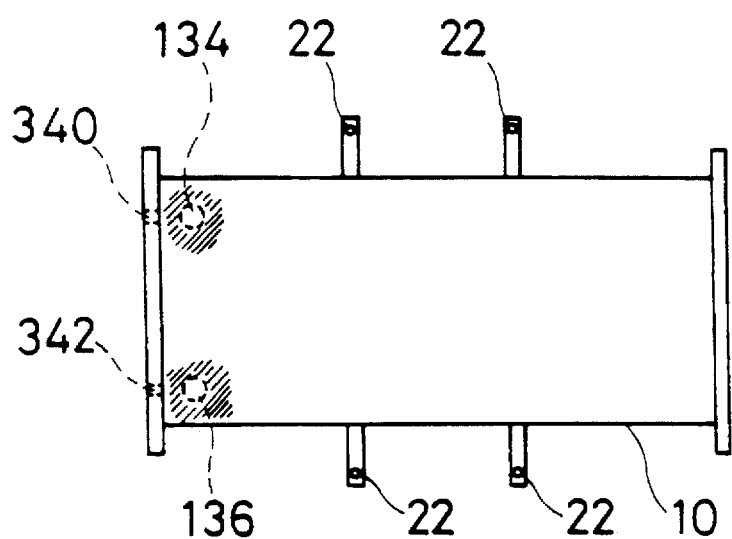
FIG. 3 is a plan view diagramatically showing generation of heat strain on a casing in the first and a third embodiments of a laser oscillator of the invention.

In a preparatory operation of the laser oscillator, the cooling medium circulates in the casing 10 between the inlet port 134 and the outlet port 136, and changes the temperature of the casing 10 gradually from the room temperature to a temperature near the cooling medium temperature, as in the laser oscillator of related art. In case the cooling medium temperature is lower than the room temperature, a part (particularly of the bottom wall) of the casing 10 shown by slanted lines in FIG. 3 is partially cooled by heat conduction from the inlet port 134 and the outlet port 136. However, the amount of the cooling medium flowing in the casing is large, so that the temperatures are substantially the same at the inlet and the outlet. Thus, similar contractions are caused by heat expansion at the upper part (the supporting rod 24a, 24b side) and the lower part (the supporting rod 24c side) of the casing 10 as shown in FIG. 3, so that there is no strain that may cause distortion on the casing 10. Namely, there is no first mode of casing strain. As a result, the base plates 20a and 20b supported by the casing 10 do not change their positions, so that the pointing of the laser beam is stabilized when the laser is oscillating.

In short, with the above structure, the casing 10 has its right and left side in the laser beam direction cooled with the same condition. As a result, the casing 10 does not generate distortion by heat strain when cooled at the inlet port 134 and the outlet port 136, so that the first mode of casing strain is substantially removed.

Here, while, in the illustrative embodiment shown in the FIGS. 1 and 2, the inlet port 134 and the outlet port 136 are symmetrically positioned at the opposite bottom corners of one longitudinal lateral side of the casing 10, they may be placed at other positions as long as they are symmetrically positioned relative to the lateral center line of the casing 10. For example, they may be positioned away from the corners toward the center line. None the less, if they are positioned at the corners, the interior space can be effectively utilized and degree of freedom in disposing the heat exchanger 8 and the like in the casing 10.

Figure 4:
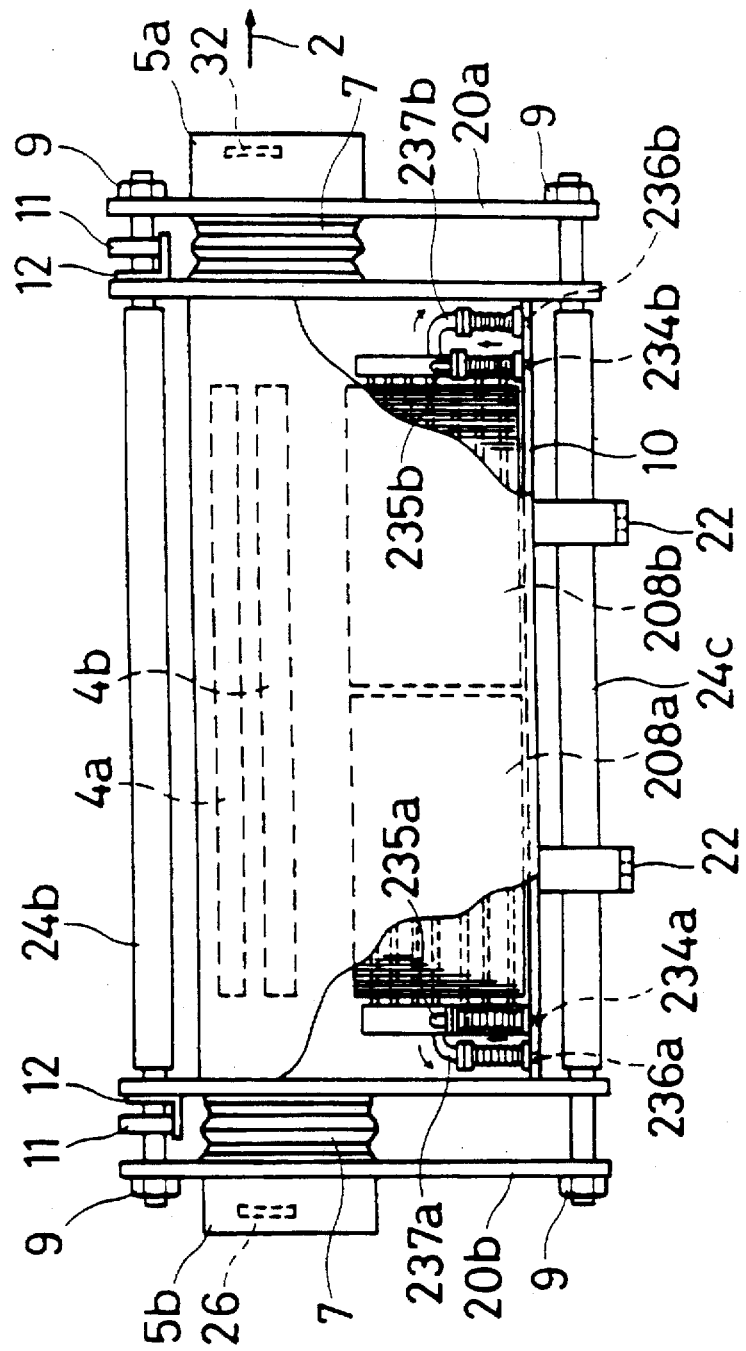
FIG. 4 is a front view showing a second embodiment of a laser oscillator of the invention.
Figure 5:
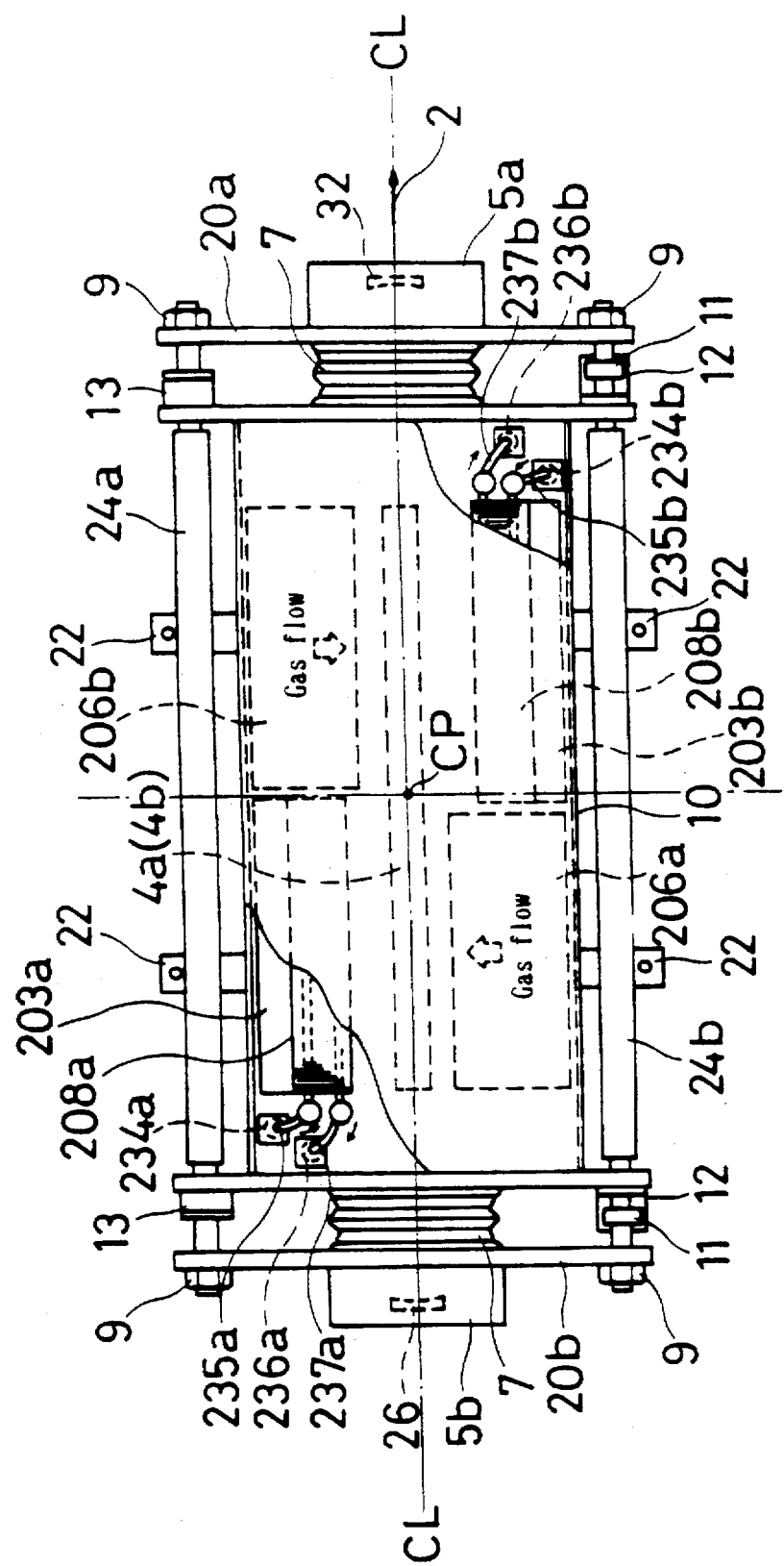
FIG. 5 is a plan view showing a laser oscillator of FIG. 4.

FIG. 4 is a front view showing a second embodiment of a laser oscillator of the invention. FIG. 5 is a plan view showing a laser oscillator of FIG. 4. The inventive laser oscillator of this embodiment has the same structure as that of the laser oscillator of related art shown in FIG. 20, except for the characteristic features described below, and a description of the same elements will be omitted hereunder. In FIGS. 4 and 5, the same reference numerals are attached to corresponding elements to those of related art shown in FIGS. 20 and 21, and their detailed description is not provided. The following description will focus on the differences between the second embodiment of laser oscillator and the laser oscillator of the related art.

Referring to FIGS. 4 and 5, the second embodiment of the laser oscillator has a casing 10 sealingly containing a laser medium gas and a pair of discharging electrodes 4a and 4b which are oppositely disposed in the casing 10 and oscillate a laser beam by use of the laser medium gas, like the first embodiment of laser oscillator.

In the second embodiment, a pair of blowers 206a and 206b are provided as circulating means which circulate the laser medium gas in the casing 10. A pair of heat exchangers 208a and 208b are also arranged in the casing 10 and cool the laser medium gas which has a high temperature due to the discharge of the discharging electrodes 4a and 4b. The inventive laser oscillator has an improved arrangement and position of the blowers 206a and 206b, the heat exchangers 208a and 208b, and related components, as mentioned in detail below.

The two heat exchangers 208a and 208b are disposed in the casing 10 at substantially symmetrical positions to each other in relation to a center point CP of the casing 10 when seen in the plan view of FIG. 5. Ducts 203a and 203b are attached to the heat exchangers 208a and 208b, respectively, in the casing 10. Inlet ports 234a and 234b are arranged for the heat exchangers 208a and 208b, respectively, at positions of the bottom wall of the casing 10 near the heat exchangers 208a and 208b. The cooling medium is introduced and supplied from each inlet port 234a, 234b to each corresponding heat exchanger 208a, 208b through each pipe 235a, 235b that connects the corresponding inlet port 234a, 234b and heat exchanger 208a, 208b. Outlet ports 236a and 236b are arranged for the heat exchangers 208a and 208b, respectively, at positions of the bottom wall of the casing 10 near the heat exchangers 208a and 208b. The cooling medium goes out of each heat exchanger 208a, 208b through each pipe 237a, 237b that connects the corresponding outlet port 236a, 236b and heat exchanger 208a, 208b, and is discharged out of the casing 10 via each corresponding outlet port 236a, 236b.

An operation of the above structured laser oscillator is described hereunder.

Figure 6:
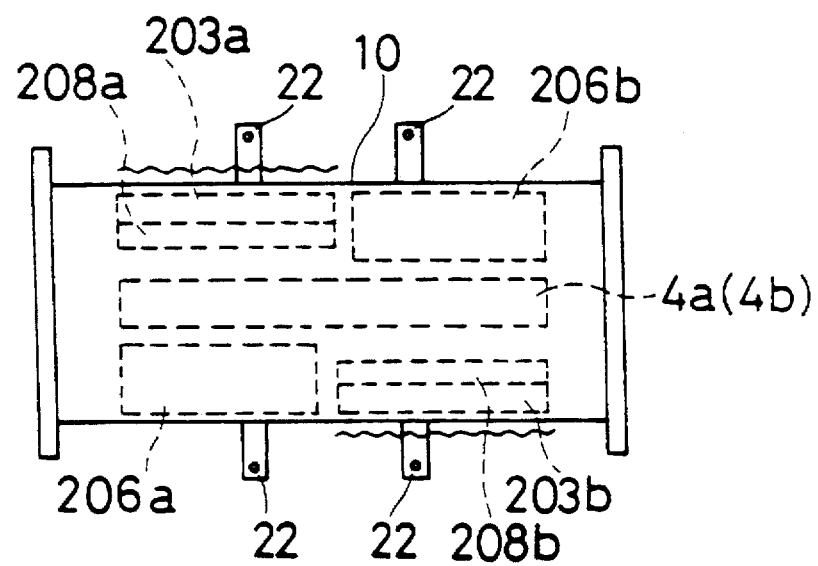
FIG. 6 is a plan view diagramatically showing generation of heat strain on a casing in the second embodiment of a laser oscillator of the invention.

When operating the laser oscillator, the laser medium gas, which has a high temperature after passing a pair of discharging electrodes 4a and 4b, flows in the ducts 203a and 203b, the ducts 203a and 203b are raised to a high temperature, as in the laser oscillator of related art. Then, portions of the casing 10 near the ducts 203a and 203b receive heat from the ducts 203a and 203b, respectively, by heat radiation of the ducts 203a and 203b. Thus, the portions facing the ducts 203a and 203b gradually rise their temperatures, and expand by heat expansion. Here, the ducts 203a and 203b are disposed at substantially symmetrical positions to each other in relation to the center point CP of the casing as seen in FIG. 5, according to the arrangements of the heat exchangers 208a and 208b. Therefore, portions of the lateral side wall of the casing 10, shown respectively by wave lines in FIG. 6, are heated by heat radiation of the ducts 203a and 203b. Still, the one wall portion (upper one in FIG. 6) and the other wall portion (lower one in FIG. 6) expand in the same manner by linear expansion, thereby decreasing such strain as produces deflection on the casing 10. Namely, the second mode of casing strain can be lessened, so that the positions of the base plates 20a and 20b supported by the casing 10 are hard to change, thereby making the laser beam pointing stable when oscillating the laser. The improved features of this embodiment is most effective when combined with characteristic features of a fifth embodiment, which will be described later. Such combination will be described as an eighth embodiment.

With the above structure, the casing 10 has its right and left side in the laser beam direction cooled with the same condition. As a result, the casing 10 does not generate distortion by heat strain when cooled by heat radiation from the heat exchangers 208a and 208b, so that an amount of the second mode of casing strain can be lessened.

While in the illustrative embodiment shown in the FIGS. 4 and 5, two heat exchangers 208a and 208b are arranged in the casing 10 near the upper right corner and the lower left corner thereof, they may be provided in another number or at another positions, as long as they are placed at substantially symmetrical positions relative to the center point of the casing 10. Moreover, the heat exchangers 208a and 208b may be disposed at such positions as make circulation of the laser medium gas most efficient, in consideration of the flow of the laser medium gas. In this case, the laser medium gas circulating in the casing 10 can be effectively cooled by the heat exchangers 208a and 208b.

A third embodiment of laser oscillator is shown in FIGS. 1 and 2 which are also used for the description of the first embodiment. The following description will focus on the characteristic features of the third embodiment, referring to FIGS. 1 and 2.

In the figures, the inventive laser oscillator has improvements in arrangements for carrying the cooling medium to and out of the discharging electrodes 4a and 4b. Namely, an inlet port 340 for the discharging electrodes 4a and 4b is disposed at one corner part of one lateral side wall of the casing 10 so as to introduce a cooling medium into the casing 10. In the illustrated embodiment, as shown in FIG. 2, the position of the inlet port 340 is set at a corner of the left wall that is near the back wall and the upper wall of the casing 10. The inlet port 340 is connected to the pipe 341 and the cooling medium is fed to the upper electrode 4a through the pipe 341. On the other hand, the outlet port 342 for the discharging electrodes 4a and 4b is disposed at another corner part of the one lateral side wall of the casing 10 so as to discharge the cooling water out of the casing 10. In the illustrated embodiment, as shown in FIG. 2, the position of the outlet port 342 is set at a corner of the left wall that is near the front wall and the upper wall of the casing 10. Moreover, the inlet port 340 and the outlet port 342 have a special positional relationship to each other. Namely, they are disposed at substantially symmetrical positions in relation to a center line of the side wall of the casing 10 that extends in a height direction at right angle with the longitudinal direction of the discharging electrode 4a, 4b. The discharging electrodes 4a and 4b have their other end connected with a pipe 45, and the cooling medium is sent from the upper electrode 4a to the lower electrode 4b. The outlet port 342 is connected to the lower discharging electrode 4b via a pipe 343 and the cooling medium is conducted out of the casing 10 via the pipe 343.

An operation of the above structured laser oscillator is described hereunder.

In a preparatory operation of the laser oscillator, the cooling medium circulates in the casing 10 between the inlet port 340 and the outlet port 342, and changes the temperature of the casing 10 gradually from the room temperature to a temperature near the cooling medium temperature, as in the laser oscillator of related art. In case the cooling medium temperature is lower than the temperature, a part (particularly of the left wall) of the casing 10 shown by slanted lines (hatching) in FIG. 3 is partially cooled by heat conduction from the inlet port 340 and the outlet port 342. However, the amount of the flowing coolant is large, so that the temperatures are substantially the same at the inlet and the outlet. Thus, similar contractions are caused by heat expansion at the upper part (the duct 3 side) and the lower part (the blower 6 side) of the casing 10 shown in FIG. 3, so that there is no strain as causes distortion on the casing 10. Namely, there is no first mode of casing strain. As a result, the base plates 20a and 20b supported by the casing 10 do not change their positions, so that the pointing of the laser beam is stabilized when the laser is oscillating.

In short, with the above structure, the casing 10 has its right and left side in the laser beam direction cooled with the same condition. As a result, the casing 10 is not distorted by heat strain when cooled at the inlet port 340 and the outlet port 342, so that the first mode of casing strain is substantially eliminated.

Here, while, in the illustrative embodiment shown in FIGS. 1 and 2, the inlet port 340 and the outlet port 342 are symmetrically positioned at the opposite corners of the upper end of the one lateral side wall of the casing 10, they may be placed at other positions as long as they are symmetrically positioned relative to the vertically extending center line CL—CL of the casing 10. For example, they may be positioned away from the corners toward the center line. Still, if they are positioned at the corners, the interior space can be most effectively utilized and there is a large degree of freedom in disposing the heat exchanger 8 and the like in the casing 10.

Figure 7:
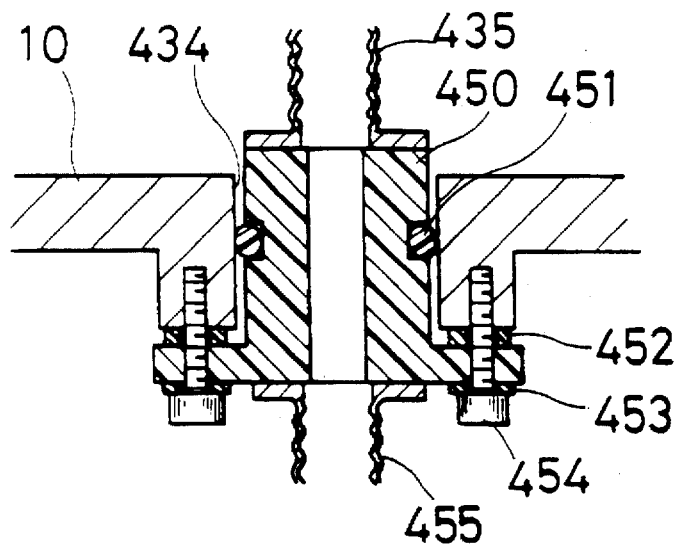
FIG. 7 is an enlarged section showing a structure of an inlet port for a heat exchanger which is disposed on a casing of a fourth embodiment of the inventive laser oscillator.

FIG. 7 is an enlarged section showing a structure of an inlet port for a heat exchanger which is disposed on a casing 10 in a fourth embodiment of the inventive laser oscillator. The fourth embodiment is characterized in the arrangements of the inlet port, and the other construction is the same as that of the related art shown in FIG. 20, so a redundant description will be omitted. In FIG. 7, the same reference numerals are attached to similar or corresponding elements to those of the first to third embodiments, and their detailed description is omitted.

In FIG. 7, an inlet port 434 for a heat exchanger is provided on the casing 10. A pipe 435 connects the inlet port 434 to the heat exchanger 8 so as to feed a cooling medium to the heat exchanger 8. A connector 450 as a piping member is fitted inside the inlet port 434 so as to define part of the passage through which the cooling medium circulates. The connector 450 has its inner axial end connected to the pipe 435. The connector 450 has a cylindrical shape with one end flanged so that the cylindrical portion is inserted into the inlet port 434 and the flanged portion is faced to an outside protrusion of the inlet port 434. An O-ring 451 as a heat insulating member is fitted around an outer perimeter of the cylindrical portion of the connector 450 so as to seal the inner surface of the inlet port 434 and the outer peripheral surface of the connector 450. An inner insulating washer 452 and an outer insulating washer 453, which constitute a heat insulating member respectively, are disposed on opposite surfaces of the flanged portion of the connector 450. Screws 454 go through the outer washer 453, the flanged portion of the connector 450 and the inner washer 452 so as to be engaged into the protrusion of the inlet port 434, thus fastening the connector 450 to the inlet port 434 while insulating them via the insulating washers 432 and 433. A pipe 455 is connected to an outer axial end of the connector 450 to introduce the cooling medium into the casing 10 via the connector 450. While the above description has been made on the inlet port 434, the same structural elements are provided on an outlet port 436 for the heat exchanger, and its detailed description is omitted to avoid redundancy.

In the above structure, since the O-ring 451 and the connector 450 is exposed to the laser medium gas in the casing 10 which is kept vacuumized, their material should be carefully selected. Generally, a nitrile rubber used for an O-ring and plastic materials such as a nylon and a polycarbonate are possibly degraded and cracked when exposed to a vacuum. Therefore, the O-ring 451 used in this embodiment is made of a material of a fluorine-contained rubber, and the connector 450 is made of a metal, a fluorine contained resin such as a PVdF, or a ceramic. The insulating washers 452 and 453 are not exposed to vacuum, so that they may be formed of plastic materials such as a polycarbonate, for example.

An operation of the above structured laser oscillator is described hereunder.

With the above structure, the cooling medium and the inlet port 434 are heat-insulated via the O-ring 451 and the insulating washers 452 and 453, so that, if the temperature of the cooling medium changes, the casing 10 is not affected by such a heat change. Moreover, if the connector 450 is made of a fluorine based resin or a ceramic which has a low heat conductivity, more advantageous effects are achieved. In such case, the insulating washers 452 and 453 may be eliminated. The outlet port 436 is similarly structured, so that the casing 10 is not affected by a temperature change of the cooling medium at the outlet. Thus, the laser beam pointing is stabilized when oscillating laser.

Figure 8:
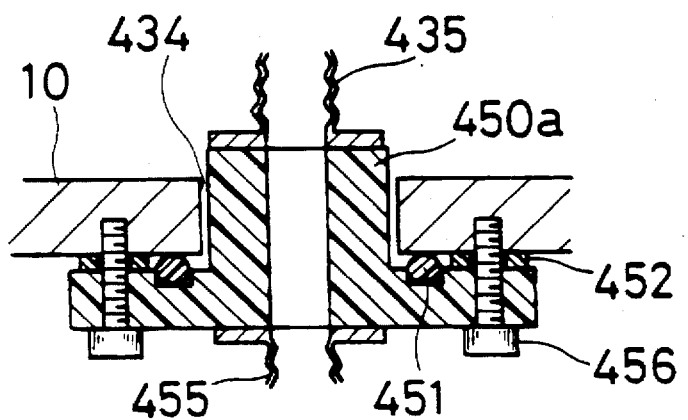
FIG. 8 is an enlarged section showing an inlet port for a heat exchanger disposed on a casing of the fourth embodiment of the inventive laser oscillator.

In the illustrative embodiment, while the connector 450 has the O-ring 451 fitted to the cylindrical portion in order to be heatingly insulated from the inlet or outlet port 434, 436, the O-ring 451 may be fitted to a flanged portion of a connector 450a, as shown in FIG. 8. In the illustrated embodiment of FIG. 8, the outside protrusion is eliminated, and the connector 450a has a shorter cylindrical portion and a larger flanged portion. The O-ring 451 is fitted to an inner position with respect to the insulating washer 452, and supports the connector 450a in a stable position in cooperation with the washer 452. Screws 456 for fastening the connector 450a to the casing 10 is made of a plastic material such as a polycarbonate, as a heat insulating material. The connector 450a is preferably made of a fluorine contained resin or a ceramic of a low heat conductivity. In case the screw 456 or the connector 450a is made of a heat insulating material, the insulating washer 452 may be omitted.

With the above structure, the casing 10 is stable in view of temperature, regardless of the heat produced at the inlet port 434 or the outlet port 436, so that the first mode of casing strain can be lessened.

In the illustrative embodiment, while the inlet port 434 and the outlet port 436 for the heat exchanger 8 are provided with the heat insulating arrangements, as a modification of this embodiment, such arrangements may be applied to an inlet port 40 and an outlet port 42 for the discharging electrodes 4a, 4b.

In this case, the casing 10 is stable in view of temperature, regardless of the heat produced at the inlet port 40 or the outlet port 42, so that the first mode of casing strain can be lessened.

Moreover, the connector 450 as a passage forming member may be made of an anti-degradation material with respect to the laser medium gas sealingly contained in the casing 10, at least at a portion that is exposed to the laser medium gas.

In case part of or all the connector 450 is made of an anti-degradation material, the connector 450 is not corroded by the laser medium gas and is free from a degradation or cracks.

Accordingly, the laser medium gas will not leak at the connector 450 out of the casing 10.

Figure 9:
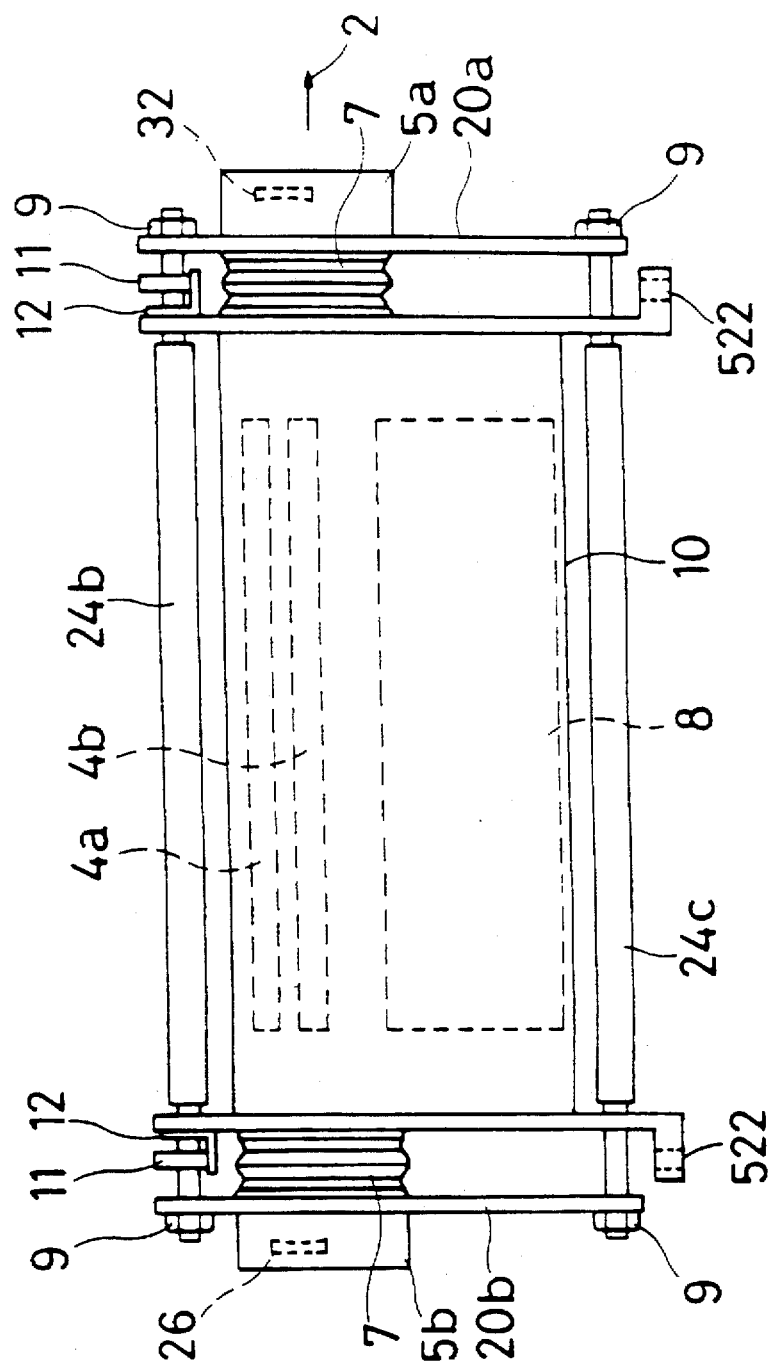
FIG. 9 is a front view showing a fifth embodiment of a laser oscillator of the invention.
Figure 10:
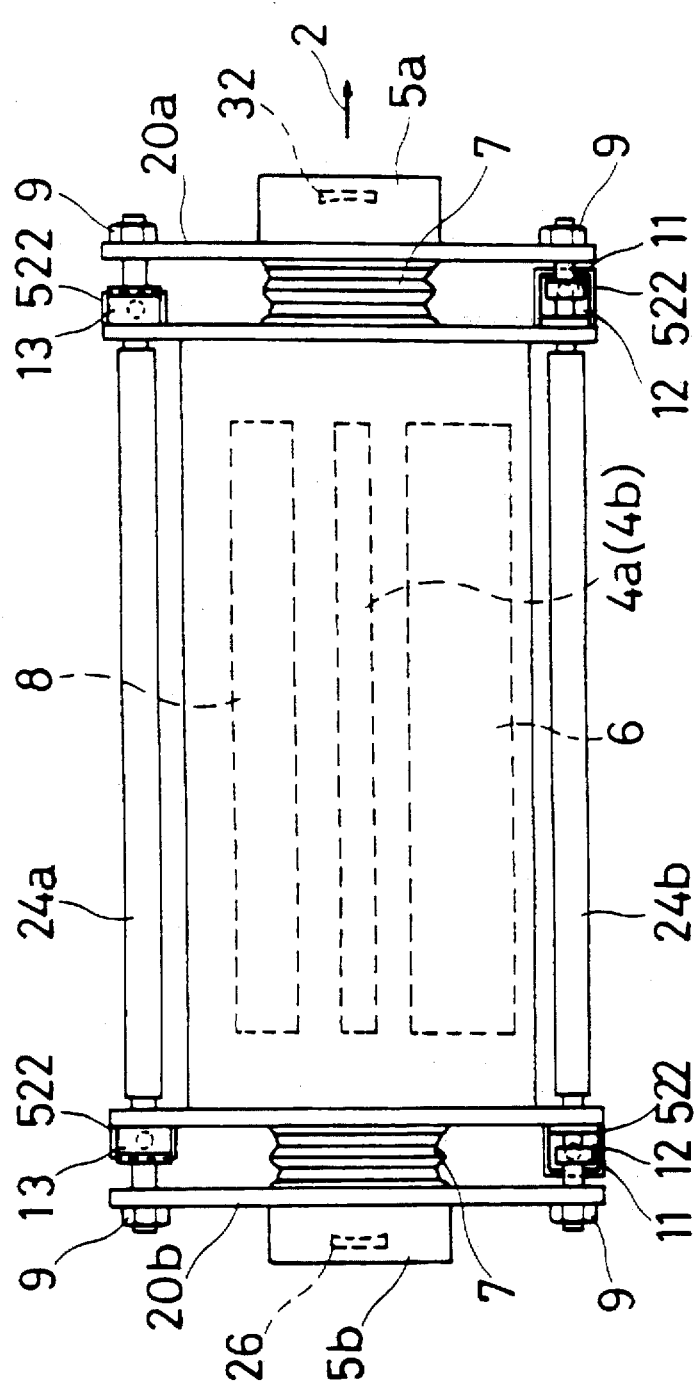
FIG. 10 is a plan view showing a laser oscillator of FIG. 9.
Figure 11:
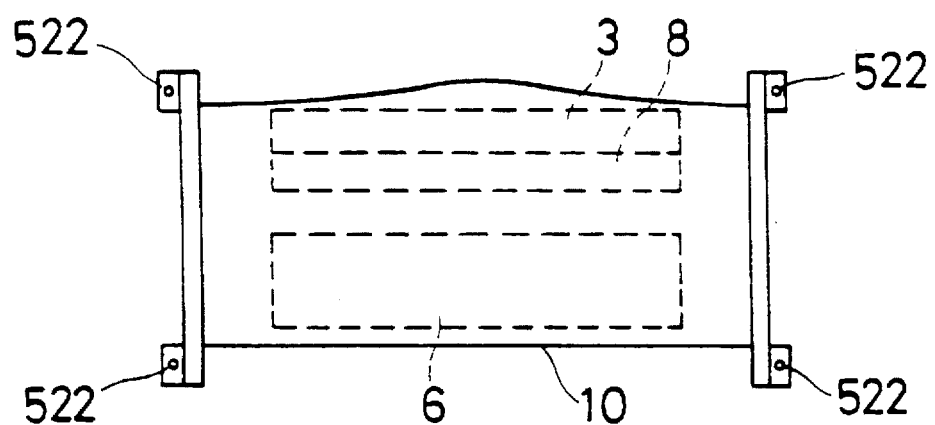
FIG. 11 is a plan view diagramatically showing generation of heat strain on a casing in the fifth embodiment of a laser oscillator of the invention.
Figure 22:
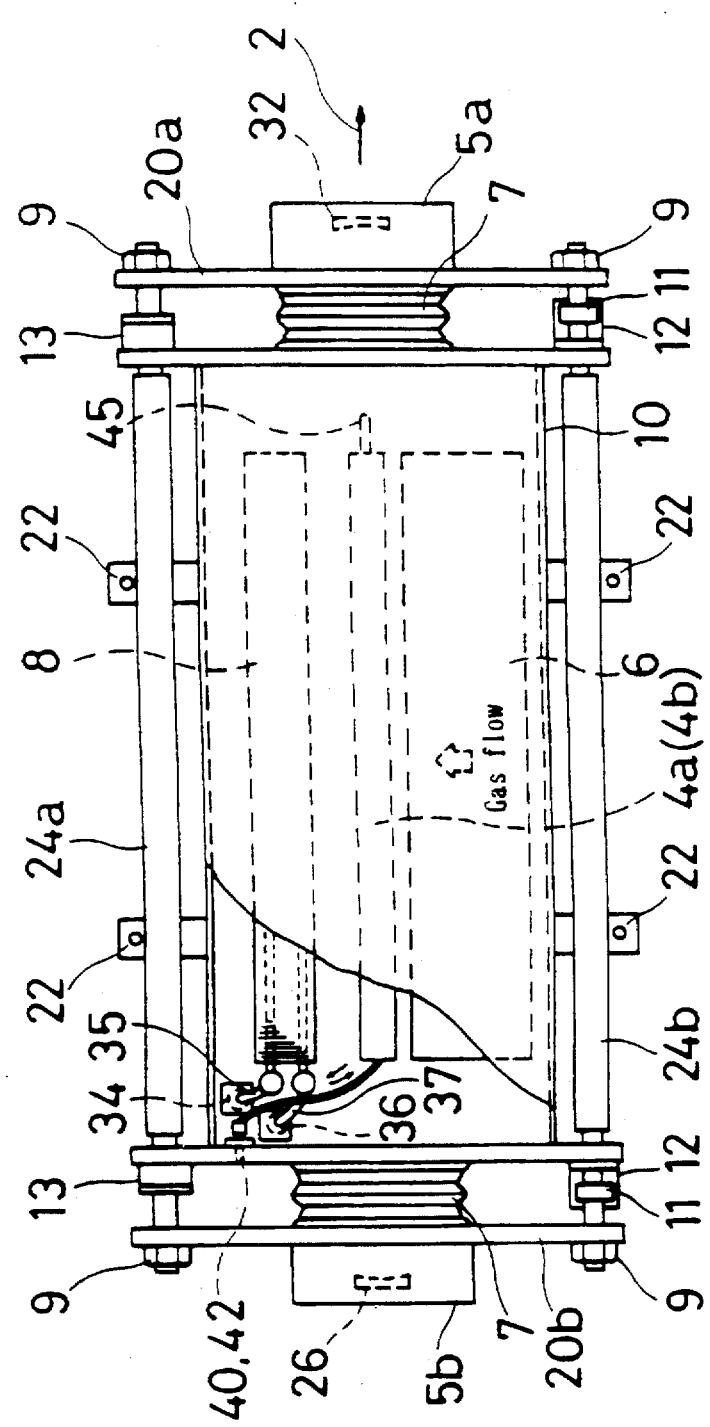
FIG. 22 is a plan view of the oscillator of FIG. 21.

FIG. 9 is a front view showing a fifth embodiment of a laser oscillator of the invention. FIG. 10 is a plan view showing a laser oscillator of FIG. 9. The inventive laser oscillator has the same structure as that of the laser oscillator of related art shown in FIG. 20 except for certain characteristic features described below, and a description of such similar members or elements will be omitted hereunder. In FIGS. 9 and 10, the inventive laser oscillator has an arrangement similar to those of FIGS. 21 and 22, except the arrangement of fixing seats, accordingly, the same reference numerals are attached to similar or corresponding members or elements to those of the related art shown in FIGS. 20 and 21, thereby eliminating their detailed description. The following description will be made mainly about the differences between the inventive laser oscillator and the laser oscillator of the related art.

In the figures, a pair of base plates 20a and 20b are supported on the casing 10 in such a way as face to each other via supporting members. The supporting members are composed of roller bearings 11, brackets 12, housings 13, spherical bearings 14 and flanges 15. The roller bearing 11 is fitted to an outer peripheral surface of a plurality of (two in the illustrative embodiment) supporting rods 24a and 24b. Thus, laser beam reflecting units 5a and 5b, which are mounted with laser reflectors, are held by the supporting members.

Four fixing seats 522 are fixed to the casing 10 substantially right under the opposite ends of the upper two supporting rods 24a and 24b, respectively. In the illustrative embodiment, the fixing seats 522 are integrally formed on opposite corners of a lower end of the side wall of the casing 10. Here, as mentioned in the description of the related art, even if the casing 10 is applied with such a stress as to distort it due to expansion or contraction by heat strain, the fixing seats 522 (22 in the related art) are hard to change their positions since they are secured to a rigid structure. Accordingly, with the above construction, even if the temperature of a portion near the duct 3 of the casing 10 rises at the time of laser oscillation, portions of the casing 10 which are respectively supported by the supporting rods 24a, 24b and 24c are prevented from moving, and do not substantially change their positions. Thereby, laser beam pointing is stabilized when oscillating the laser, even with respect to the second mode of casing strain. This embodiment also has the same advatageous effects against the first mode of casing strain.

Advantages of the fixing seats 522 of the present embodiment are described in comparison with those of prior art.

For example, Japanese Patent Publication (Kokai) Nos. 57-97689, 61-188987 and 2-168683 respectively disclose similar structures to that of the present embodiment. However, the prior art shown in these publications are different from the present embodiment in that the base plates 20a and 20b or the supporting rods 24a, 24b and 24c shown in FIGS. 9 and 10 are fixed or slidably mounted on a rigid structure such as pedestals that directly fix the laser oscillator. Namely, these arts secure a base plate at the side from which the laser beam is taken out (the base plate 20a of FIG. 10) and aim to absorb movement of the structure by making a member corresponding to the plate 20b slidable or using a ladder shown in the publication 2-168683. They do not disclose nor suggest any members that absorb movement of a cylindrical exciting portion (61-188987), a laser tube (2-168683) or a laser oscillator (57-97689) which corresponds to the casing of the present embodiment. Namely, they have totally different objects from the present invention according to the fifth embodiment. Moreover, they do not have any disclosure nor suggestion of the basic structure of the present embodiment that base plates are supported by spherical bearings and roller bearings and that distortion of a casing is absorbed by the spherical bearings. Furthermore, in the present embodiment, the casing 10 is fixed to the structure, and the supporting rods 24a, 24b and 24c can move freely to prevent distortion of the casing 10, so that there are caused no adverse influences on the base plates 20a and 20b. To the contrary, in the prior art structures, the base plates from which the laser beam is taken out are entirely fixed to the structure, namely, their positions are made immovable in a direction perpendicular to a longitudinal direction of the supporting rods. Therefore, in case the structure is distorted to a plane parallel to a paper plane of FIG. 10, the supporting rods are distorted according to the movement of the structure, so that an attaching angle of the base plate is changed and an output optical axis of the laser beam is moved accordingly. A Japanese Utility Model Publication (Kokai) No. 3-45673 discloses a similar art to the present embodiment. However, this publication does not disclose nor suggest any means for absorbing strain of a casing. Though it takes into account a movement in a longitudinal direction of a connecting rod (optical axis direction of the laser beam), it fails to consider the strain of a holding plate of a casing in a longitudinal direction and a vertical direction (in the paper plane of FIG. 10). Thus, the basic concept is utterly different from the present invention according to the fifth embodiment.

In the present embodiment, with the above mentioned structure, the fixing seats 522 of the casing 10 are positioned at substantially the same vertical plane as the supporting members composed of the roller bearings 11, brackets 12, housings 13, spherical bearings 14 and flanges As a result, these fixing seats 522 lessen movement of positions of the supporting members when the second mode of casing strain is generated.

In the illustrative embodiment, while the fixing seats 522 are positioned right under the supporting rods 24a and 24b, they may be placed at another positions as long as they are positioned substantially at longitudinal ends of the casing 10.

Figure 12:
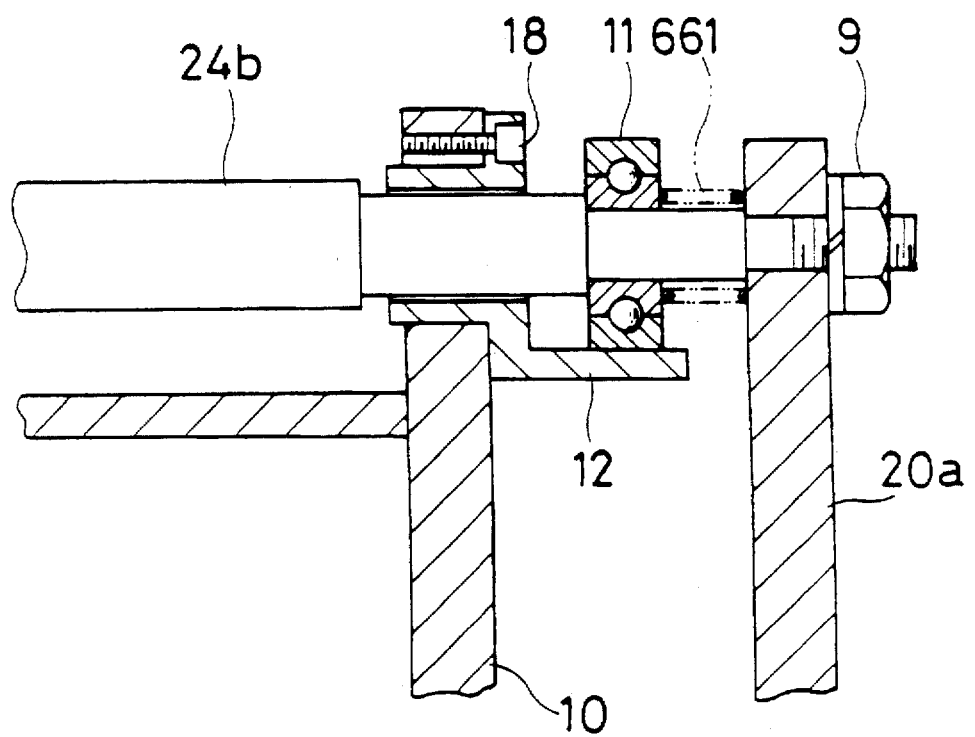
FIG. 12 is an enlarged section of a sixth embodiment of laser oscillator showing a supporting rod and a supporting member which support a base plate to a casing.
Figure 23:
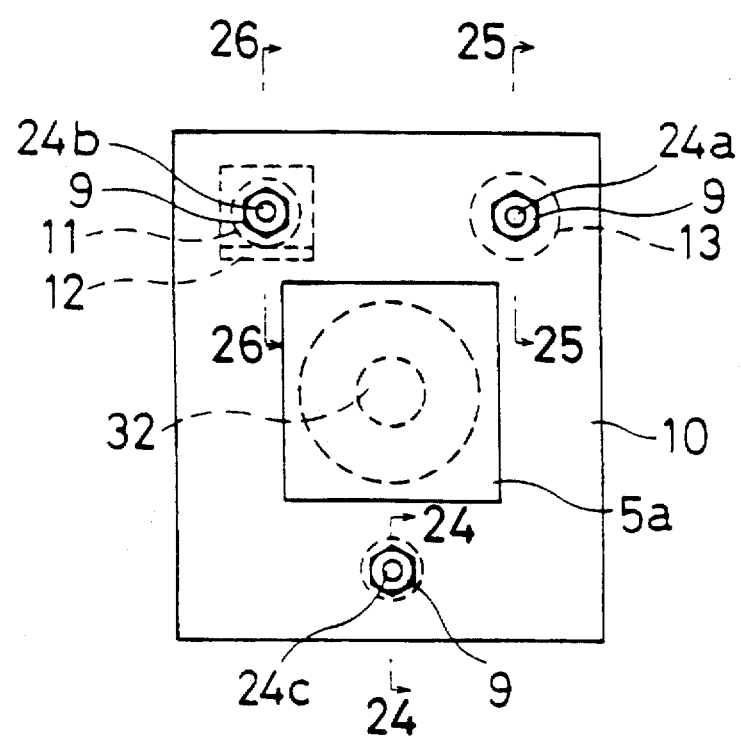
FIG. 23 is a right side view of the oscillator of FIG. 21.

FIG. 12 is an enlarged section of a sixth embodiment of laser oscillator showing a supporting rod and a supporting member which support a base plate to a casing. It corresponds to a section taken along the line 26—26 of FIG. 23. The inventive laser oscillator of this embodiment has the same structure as that of the laser oscillator of related art shown in FIG. 20 except characteristic features described below, and description of the same elements will be omitted hereunder. In FIGS. 12, the same reference numerals are attached to corresponding elements to those of first to fifth embodiments, thereby eliminating their detailed description. In the figure, a spring 661 is interposed between the roller bearing 11 and the supporting rod 24b so as to make the roller bearing 11 always contacted with a shoulder of the supporting rod 24b.

Figure 26:
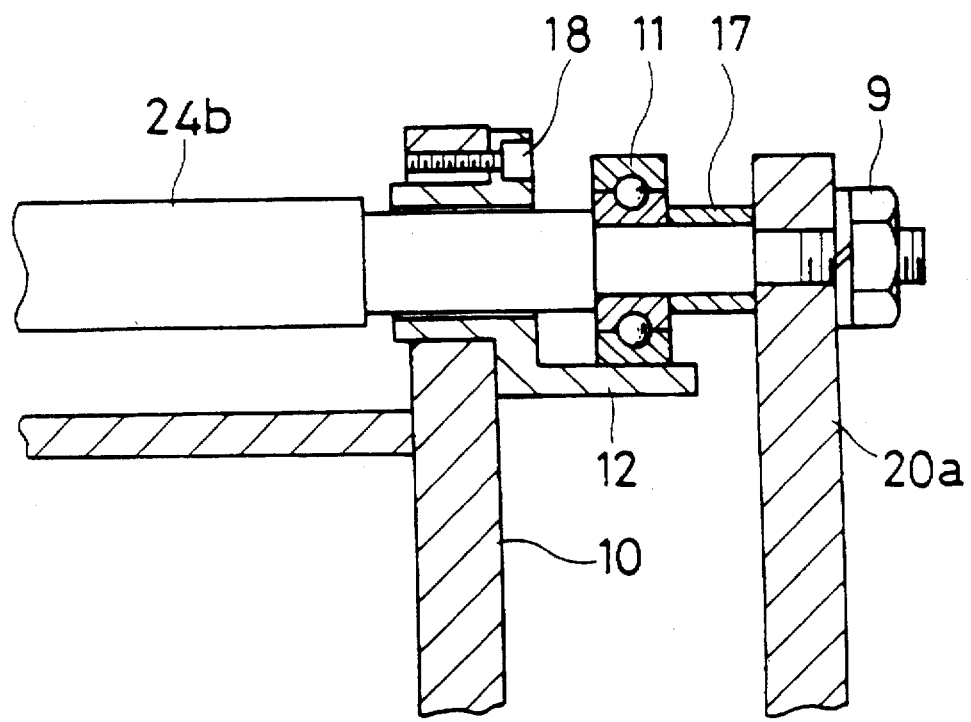
FIG. 26 is an enlarged section taken along the line 26—26 and showing details of the oscillator of FIG. 23.

As described before, the collar 17 and the roller bearing 11 of related art shown in FIG. 26 are preferably made of a material, such as invar, having a low linear expansion coefficient. However, such a material has a very low workability and is hard to be machined, so that those structures are actually made of more common metals, such as an iron, which is easy to be machined. If such members change their temperatures, a heat expansion is brought forth according to lengths of the collar 17 and the roller bearing 11. Then, when the temperature becomes high, the collar 17 and the roller bearing 11 is expanded more than the supporting rod 24b. Therefore, in the related art, the distance between the shoulder of the supporting rod 24b that touches the roller bearing 11 and the base plate 20a becomes longer, so that the distance between the two base plates 20a and 20b is enlarged at a portion supported by the supporting rod 24b, thereby distorting the parallelism of the base plates 20a and 20b.

To the contrary, according to the embodiment of FIG. 12, the spring 661 is provided instead of the collar 17, so that the roller bearing 11 is pressed against the shoulder of the supporting rod 24b by an urging force of the spring 661. This structure not only applies preload to them, but also serves to absorb change of their lengths caused by heat expansion. Namely, if the roller bearing 11 expands in its axial direction by a temperature change, the urging force of the spring 661 becomes larger accordingly, but the distance between the shoulder of the supporting rod 24b and the base plate 20a is still determined by the length of the supporting rod 24b. The supporting rod 24b itself is made of a material of a low linear expansion coefficient, so that the parallelism of the base plates 20a and 20b are kept good with high accuracy. Accordingly, the laser beam pointing is stabilized when oscillating laser.

In short, with the above structure, the relative positional relationship of one of the two roller bearings 11 and the supporting rod 24b, which is connected integrally to the base plate 20a, is determined mechanically.

Accordingly, the relative positional relationship of the roller bearing 11 and the supporting rod 24b can be maintained so as to eliminate interference of the supporting rod 24b and the casing 10.

As a result, repeatability of positions of the base plates 20a and 20b relative to the casing 10 is improved, so that the base plates 20a and 20b do not suffer from influences of heat strain of the casing 10.

In the illustrative embodiment, while the roller bearing 11 is pressed to the supporting rod 24b by the spring 661, any elastic member may be used instead thereof so as to perform the same function and effects.

Figure 13:
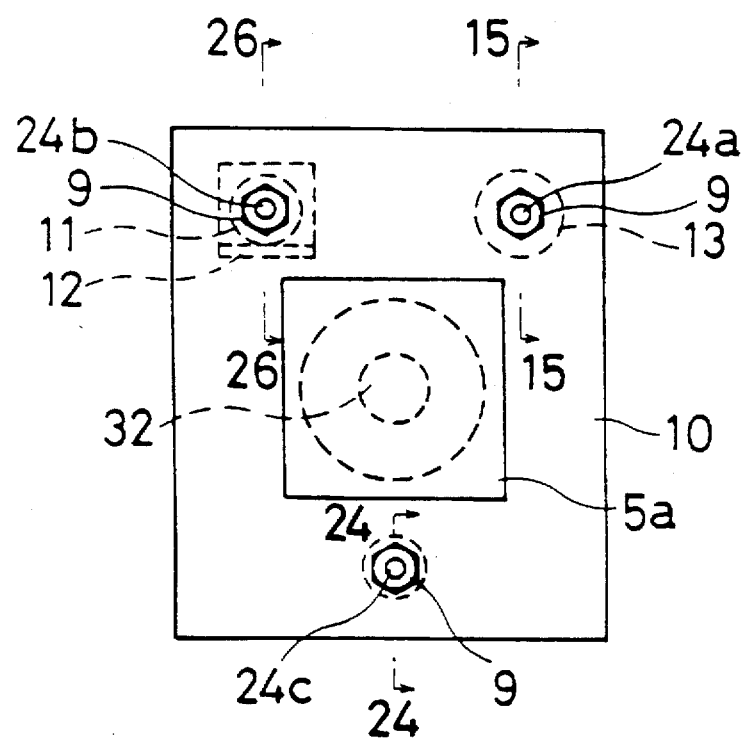
FIG. 13 is a right side view of a seventh embodiment of laser oscillator.
Figure 14:
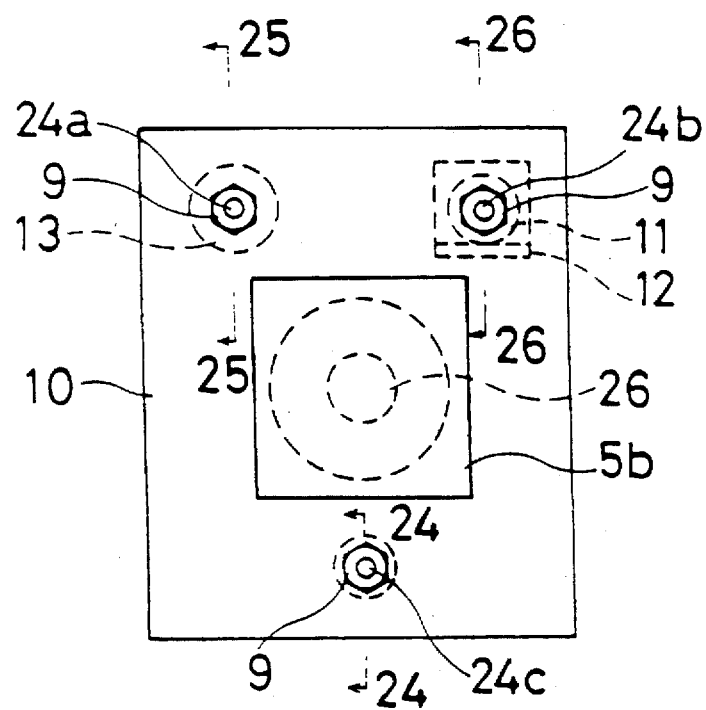
FIG. 14 is a left side view of the seventh embodiment of laser oscillator.
Figure 15:
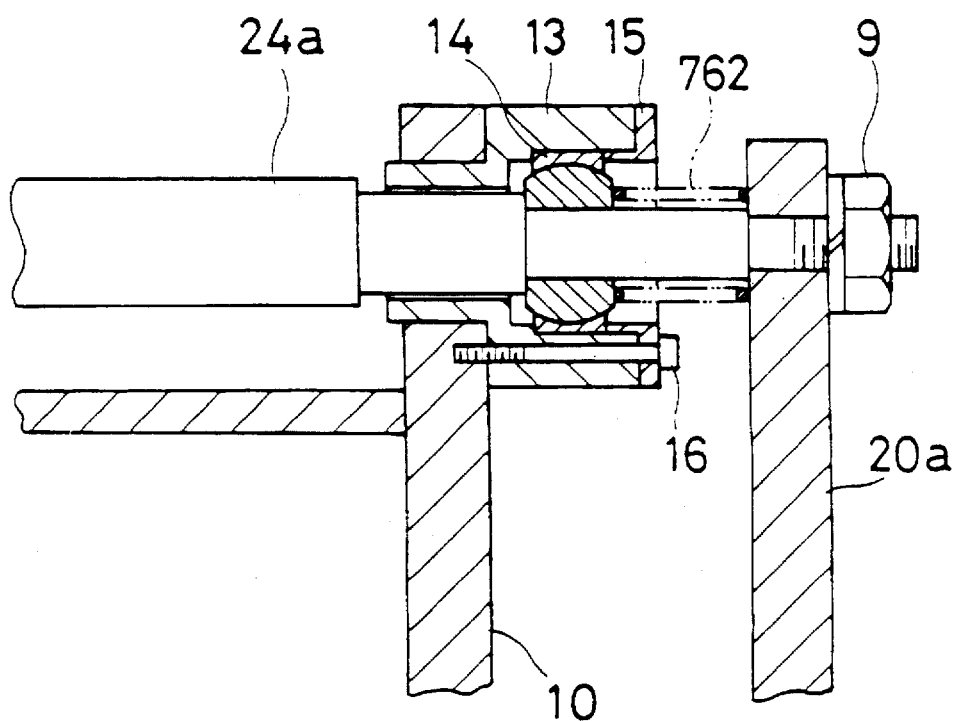
FIG. 15 is an enlarged section, taken along the line 15—15 of FIG. 13, of the seventh embodiment of laser oscillator showing a supporting rod and a supporting member which support a base plate to a casing.
Figure 24:
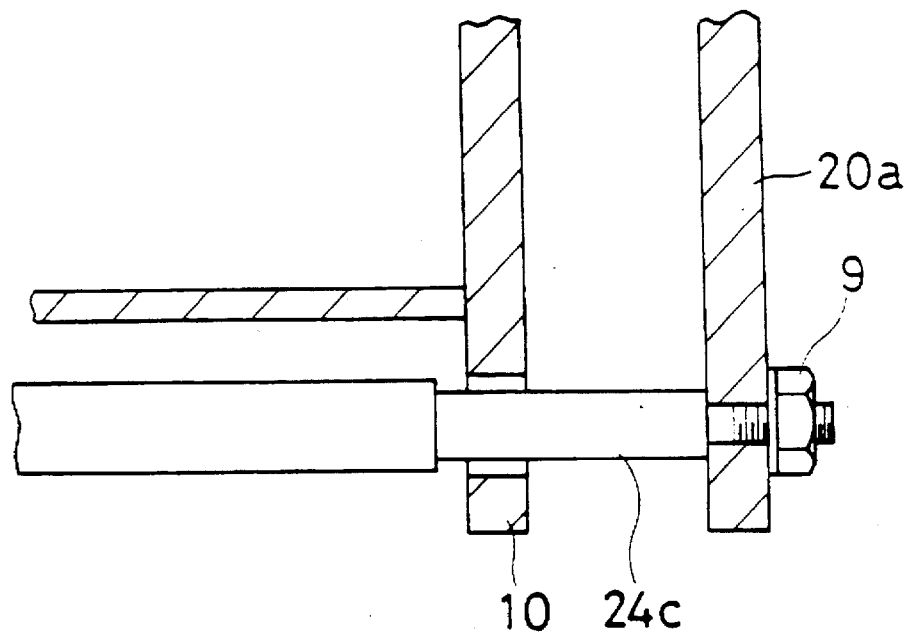
FIG. 24 is an enlarged section taken along the line 24—24 and showing details of the oscillator of FIG. 23.
Figure 25:
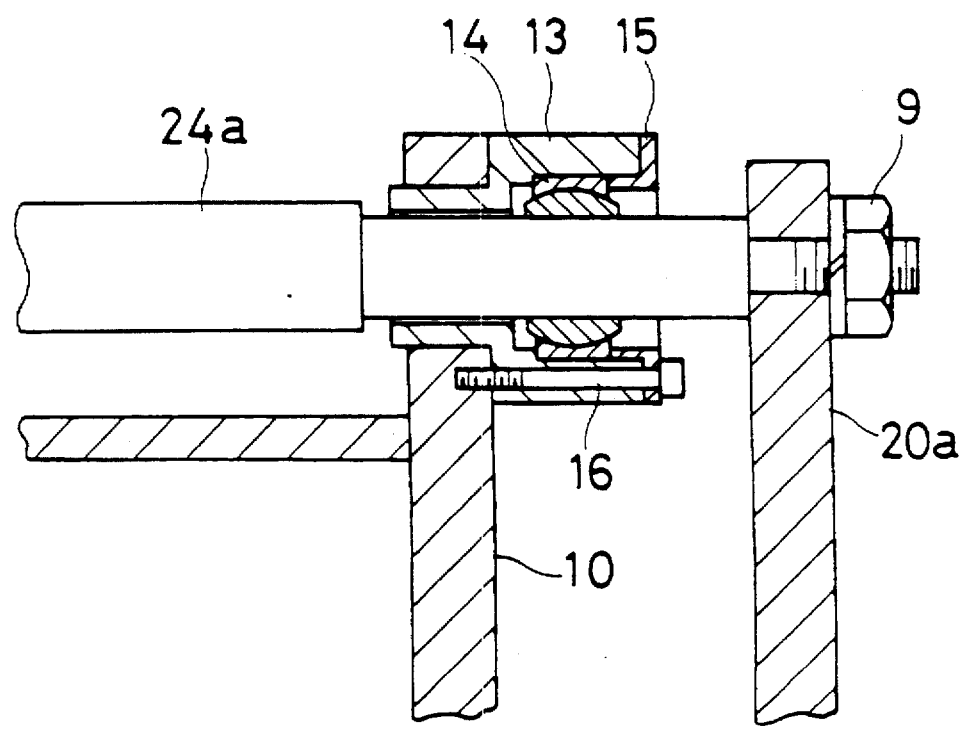
FIG. 25 is an enlarged section taken along the line 25—25 and showing details of the oscillator of FIG. 23.

FIG. 13 is a right side view of a seventh embodiment of laser oscillator. FIG. 14 is a left side view of the seventh embodiment of laser oscillator. FIG. 15 is an enlarged section, taken along the line 15—15 of FIG. 13, of the seventh embodiment of laser oscillator showing a supporting rod and a supporting member which support a base plate to a casing. The inventive laser oscillator of this embodiment has the same structure as that of the laser oscillator of the related art shown in FIG. 20 except characteristic features described below, and description of the same elements will be omitted hereunder. The seventh embodiment has improvements in the supporting arrangements for the base plate and the other arrangements are similar to those of related art. In FIG. 15, the same reference numerals are applied to corresponding elements to those of first to sixth embodiments, and their detailed description is omitted. Here, a section taken along the line 25—25 of FIG. 14 is the same as the arrangements of related art shown in FIG. 25. Sections taken along the line 26—26 and 24—24 of FIGS. 13 and 14 are the same as the arrangements of related art shown in FIG. 26 and 24.

In FIG. 15, a spring 762 is interposed between the spherical bearing 14 and the supporting rod 24a so as to make the spherical bearing 14 always contact a shoulder of the supporting rod 24a.

In the laser oscillator of related art, the supporting arrangements for each of the three supporting rods 24a, 24b and 24c is same at both ends or at the side of the base plate 20a and the side of the base plate 20b. Thereby, while the supporting rod 24a and the housing 13 move independently unless they are contacted, the supporting rod 24a and the base plate 20a supported thereby move according to distortion of the casing 10 once the shoulder of the supporting rod 24a abuts to the housing 13. Since the contacted portion of the supporting rod 24a to the housing 13 is not always same, repeatability of movements of the base plates 20a and 20b is low, and it causes a factor of lack of repeatability of laser beam pointing.

In the present embodiment, the supporting rod 24a has different supporting arrangements at opposite ends or at the side of the base plate 20a and the side of the base plate 20b.

Namely, a pair of spherical bearings 14 are fitted to the outer periphery of the opposite ends of the supporting rod 24a via the housings 13 and the flanges 15, respectively. However, one of the bearings 14 or the one at the side of the base plate 20a is pressed to the shoulder of the supporting rod 24a by the spring 762 so as to mechanically fix its positional relationship to the base plate 20a. Therefore, if a large acceleration is applied to the bearing 14 at the time of transportation or the like, the relative positional relationship of the base plates 20a and 20b and the casing 10 does not change, so that the repeatability of the laser beam pointing is improved. Moreover, even if the length of the supporting rod 24a, 24b, 24c and the length of the casing 10 respectively change due to repeated ON and OFF operations of the laser oscillator or a change of ambient temperature, the relative position between the base plates 20a and 20b and the casing 10 always returns to an initially set arrangement when they return to their original lengths, respectively. Thus, there arises no change with time in the characteristics of the laser beam. Furthermore, as in the sixth embodiment, if the spherical bearing 14 expands in its axial direction by a temperature change, the urging force of the spring 762 becomes larger accordingly, but the distance between the shoulder of the supporting rod 24a and the base plate 20a is still determined by the length of the supporting rod 24a. The supporting rod 24a itself is made of a material of a low linear expansion coefficient, so that the parallelism of the base plates 20a and 20b is maintained good with high accuracy. Accordingly, the laser beam pointing is stabilized when oscillating laser.

In short, with the above structure, the relative positional relationship of one of the two spherical bearings 14 and the supporting rod 24a, which is connected integrally to the base plate 20a, is determined mechanically.

Accordingly, the relative positional relationship of the spherical bearing 14 and the supporting rod 24a can be kept in good condition so as to eliminate interference of the supporting rod 24a and the casing 10.

As a result, repeatability of positions of the base plates 20a and 20b relative to the casing 10 is improved, so that the base plates 20a and 20b are not affected by heat strain of the casing 10.

Figure 16:
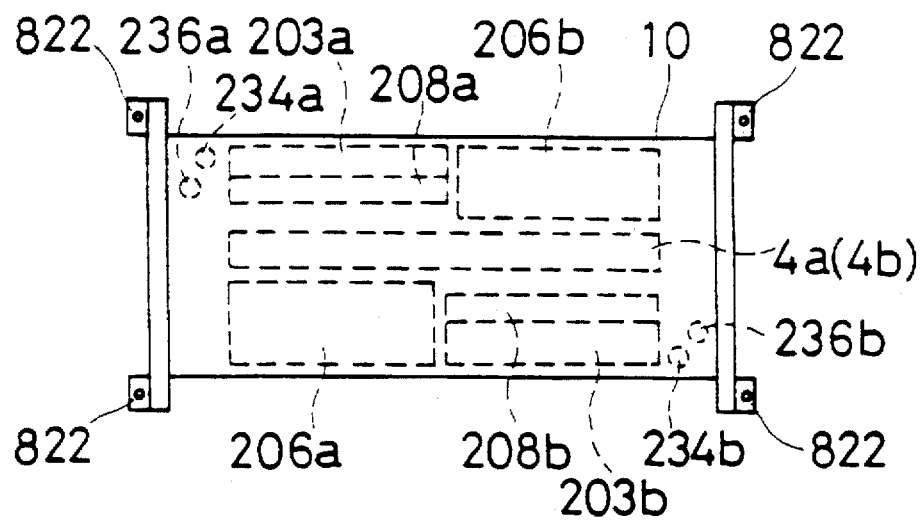
FIG. 16 is a plan view diagramatically showing an eighth embodiment of laser oscillator.

FIG. 16 is a plan view diagramatically showing an eighth embodiment of the laser oscillator. This embodiment shows a structure combining those of the second and fifth embodiments. However, while the fixing seats 22 of the second embodiment shown in FIG. 6 are disposed under the heat exchangers 208a and 208b and the ducts 203a and 203b in the longitudinal direction of the casing 10, fixing seats 822 are disposed at four corners of the casing 10 when seen from upward, namely at longitudinal ends thereof.

An operation of the above structured laser oscillator is described hereunder.

When operating the laser oscillator, the laser medium gas, which has a high temperature after passing a pair of discharging electrodes 4a and 4b, flows in the ducts 203a and 203b, and the ducts 203a and 203b are raised to a high temperature. Then, portions of the casing 10 near the ducts 203 and 203b receive heat from the ducts 203a and 203b, respectively, by heat radiation of the ducts 203a and 203b. Thus, the portions facing the ducts 203a and 203b gradually increase their temperatures, and expand. Here, as in the second embodiment, the portions of the casing 10 shown by the waves in FIG. 6, are heated by heat radiation from the ducts 203a and 203b and expand by linear expansion. However, in FIG. 6, the casing 10 has a heat strain that is canceled only at the inner portion at the four fixing seats 22. Expansion is not canceled at the outer portions of the casing 10 at the fixing seats 22. In the present embodiment, since the fixing seats 822 are disposed at longitudinal ends of the casing 10 in FIG. 16, the expansions by linear expansion at both lateral sides (upper and lower sides in the figure) of the casing 10 are completely canceled. Namely, there arises no second mode of casing strain, so that the laser beam pointing is stabilized when oscillating the laser.

Moreover, in the present embodiment, the inlet ports 234a and 234b and the outlet ports 236a and 236b for the heat exchangers 208a and 208b are disposed at substantially symmetrical positions relative to the center point of the casing 10 when seen in a view upward. These ports 234a, 234b, 236a and 236b are all arranged inside the fixing seats 822, so that there take place contractions by linear expansion similarly at the upper and lower sides in the figure of the casing 10. Thus, there arises no such strain as produces deflection on the casing 10, so that the laser beam pointing is stabilized when oscillating the laser.

Figure 17:
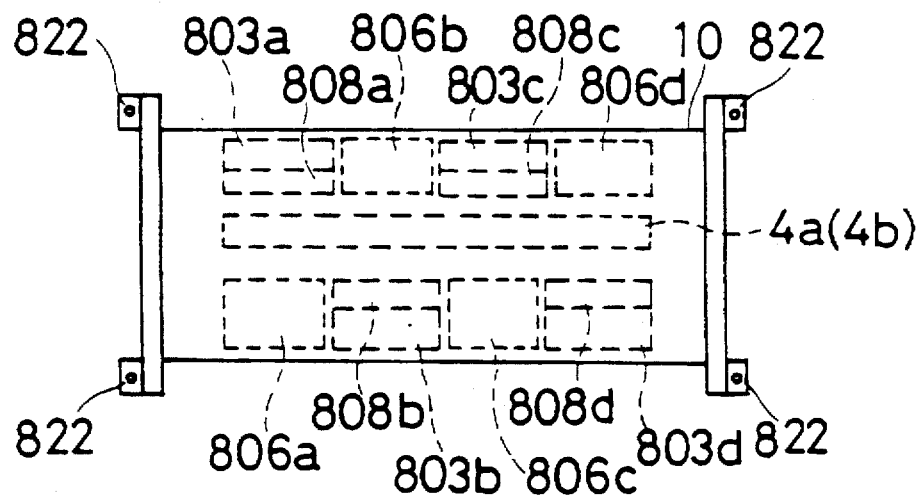
FIG. 17 is a plan view diagramatically showing generation of heat strain on a casing in a modification of the eighth embodiment of a laser oscillator of the invention.

While the present embodiment has two blowers 206a and 206b, two heat exchangers 208a and 208b and two ducts 203a and 203b, as shown in FIG. 17, there may be provided four blowers 806a, 806b, 806c and 806d, four heat exchangers 808a, 808b, 808c and 808d, and four ducts 803a, 803b, 803c and 803d, while the members in each group are substantially symmetrically positioned in relation to the center point of the casing 10 when seen in a view upward.

Figure 18:
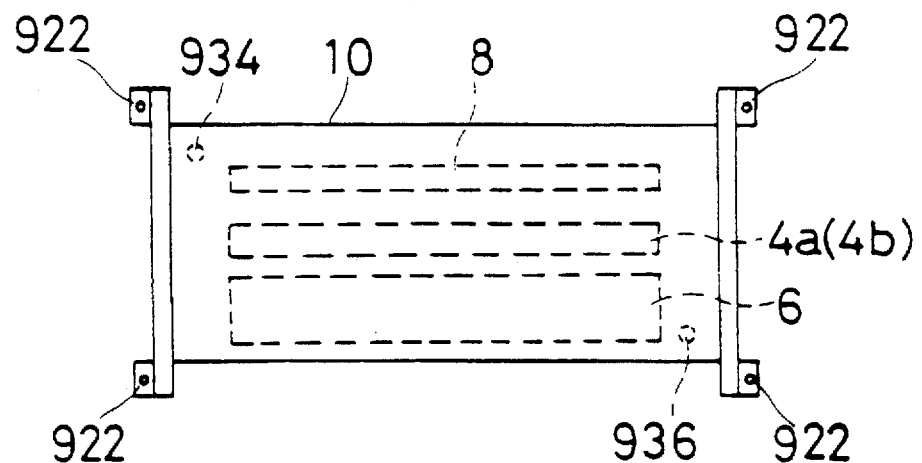
FIG. 18 is a plan view diagramatically showing a ninth embodiment of laser oscillator.

FIG. 18 is a plan view diagramatically showing a ninth embodiment of laser oscillator. This embodiment improves the fifth embodiment. In the present embodiment, fixing seats 922 are disposed at the longitudinal ends of the casing 10 as in the eighth embodiment. An inlet port 934 and an outlet port 936 for passing the cooling medium to and from the heat exchanger 8 are disposed at substantially symmetrical positions relative to the center point of the casing 10 when seen in a view upward. In this case, the inlet port 934 and the outlet port 936 are positioned at substantially the same distance from the lateral center of the casing when seen in a view upward.

An operation of the above structured laser oscillator is described hereunder.

Figure 27:
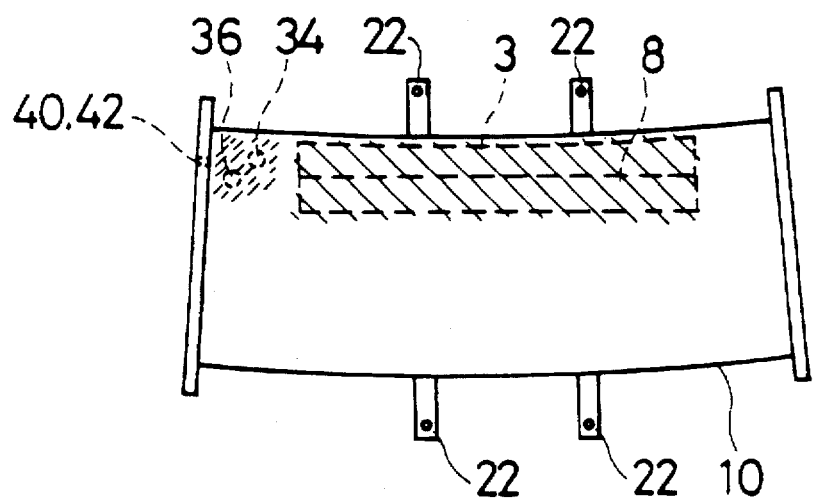
FIG. 27 is a plan view diagramatically showing generation of heat strain on a casing in related art of a laser oscillator.
Figure 28:
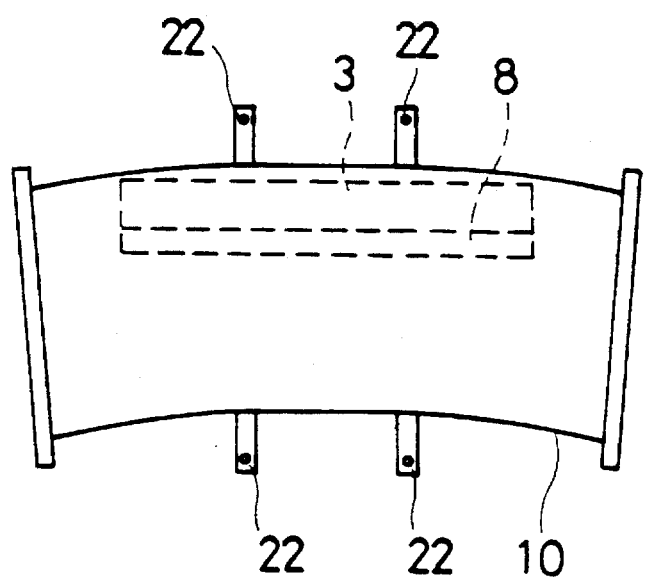
FIG. 28 is a plan view diagramatically showing generation of heat strain on a casing in related art of a laser oscillator.

Since the inlet port 934 and the outlet port 936 are arranged inside the four fixing seats 922, there take place contractions by linear expansion similarly at the upper and lower sides in FIG. 27 of the casing 10, as a whole. Thus, there arises no such strain as produces deflection on the casing 10, so that the first mode of casing strain can be restrained and the laser beam pointing is stabilized when oscillating the laser.

Moreover, the casing 10 is cooled by the ports 934 and 936 under the same condition at right and left sides in the laser beam direction.

Figure 19:
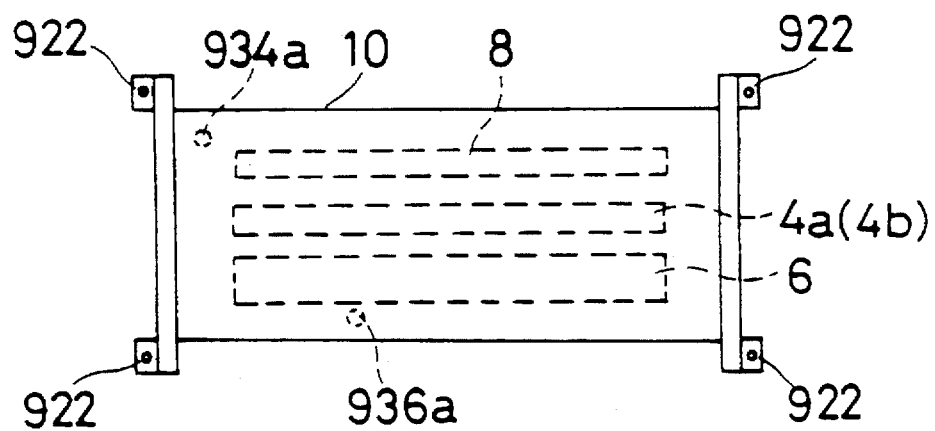
FIG. 19 is a plan view diagramatically showing generation of heat strain on a casing in a modification of the ninth embodiment of a laser oscillator of the invention.

The ninth embodiment may be modified while changing the positional relationship of the inlet port 934 and the outlet port 936a as shown in FIG. 19. In the modification of FIG. 19, the inlet port 934 and the outlet port 936a are disposed at substantially opposite positions relative to the lateral center line of the casing 10 when seen in a view upward. In this modification, there take place contractions by linear expansion similarly at the upper and lower sides in the figure of the casing 10, as a whole, as in the embodiment of FIG. 18. Thus, there arises no such strain as produces deflection on the casing 10, so that the first mode of casing strain can be restrained and the laser beam pointing is stabilized when oscillating the laser.

While the ninth embodiment has improvements in the positional relationship of the inlet port 934 and the outlet port 936 for the heat exchanger 8, such a positional relationship may be applied to the inlet port 40 and outlet port 42 for the discharging electrodes 4a and 4b.

Namely, the inlet port 40 and the outlet port 42 may be oppositely or substantially symmetrically positioned at substantially the same distance from the center line of the casing 10 parallel to the discharging electrode 4a, 4b.

The preferred embodiment described herein is illustrative and not restrictive, the scope of the invention being indicated in the appended claims and all variations which come within the meaning of the claims are intended to be embraced therein.

What is claimed is:

1. A laser oscillator comprising:
   a casing sealingly containing a laser medium gas and having a center point along a longitudinal center line;
   a pair of discharging electrodes oppositely disposed in the casing so as to oscillate a laser beam by use of the laser medium gas;
   a circulating means for circulating the laser medium gas in the casing; and
   a plurality of heat exchangers disposed in the casing to cool the laser medium gas that is heated by discharge generated by the discharging electrodes, the heat exchangers being disposed at substantially symmetrical positions in relation to the center point of the casing.

2. A laser oscillator according to claim 1, in which the positions of the heat exchangers are set substantially out of a flow route of the laser medium gas circulating in the casing.

3. A laser oscillator comprising:
   a casing sealingly containing a laser medium gas and having a center point along a longitudinal center line;
   a pair of discharging electrodes oppositely disposed in the casing so as to oscillate a laser beam by use of the laser medium gas;
   a circulating means for circulating the laser medium gas in the casing;
   a plurality of heat exchangers disposed in the casing to cool the laser medium gas that is heated by discharge generated by the discharging electrodes, the heat exchangers being disposed at substantially symmetrical positions in relation to the center point of the casing; and
   fixing seats disposed substantially at longitudinal ends of the casing so as to fix the casing to a structure.

* * * * *

UNITED STATES PATENT AND TRADEMARK OFFICE
CERTIFICATE OF CORRECTION

PATENT NO. : 5,745,513
DATED : April 28, 1998
INVENTOR(S) : Satoshi NISHIDA et al It is certified that error appears in the above-identified patent and that said Letters Patent is hereby corrected as shown below:

Please insert the following in section [62] and in column 1, after the Title of the Invention:

--Related U.S. Application Data: Division of Serial No. 432,946, May 1, 1995, 5,596,597, which is a division of Serial No. 08/654,894, May 29, 1996, 5,675,598, which is a division of Serial No. 08/825,087, March 27, 1997, 5,745,513.

Signed and Sealed this

Twenty-ninth Day of September, 1998

Attest:

BRUCE LEHMAN

Attesting Officer

Commissioner of Patents and Trademarks